United States Patent
Zhang et al.

(10) Patent No.: US 8,489,114 B2
(45) Date of Patent: *Jul. 16, 2013

(54) TIME DIFFERENCE OF ARRIVAL BASED POSITIONING SYSTEM

(75) Inventors: Xiaoxin Zhang, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,208

(22) Filed: Sep. 19, 2011

(65) Prior Publication Data

US 2013/0072218 A1 Mar. 21, 2013

(51) Int. Cl.
*H04W 24/00* (2009.01)

(52) U.S. Cl.
USPC ............... 455/456.1; 455/422.1; 370/328; 370/338

(58) Field of Classification Search
USPC ............... 455/450–452.2, 464, 456.1–457; 370/328–338
See application file for complete search history.

(56) References Cited

U.S. PATENT DOCUMENTS

| | | | |
|---|---|---|---|
| 6,034,635 A | 3/2000 | Gilhousen | |
| 6,166,685 A | 12/2000 | Soliman | |
| 6,420,999 B1 | 7/2002 | Vayanos | |
| 6,618,005 B2 | 9/2003 | Hannah et al. | |
| 6,744,398 B1 | 6/2004 | Pyner et al. | |
| 7,289,813 B2 | 10/2007 | Karaoguz | |
| 2001/0053699 A1 | 12/2001 | McCrady et al. | |
| 2002/0155845 A1 | 10/2002 | Martorana | |
| 2002/0196184 A1 | 12/2002 | Johnson et al. | |
| 2003/0134647 A1* | 7/2003 | Santhoff et al. | 455/456 |
| 2004/0008138 A1 | 1/2004 | Hockley et al. | |
| 2004/0147269 A1 | 7/2004 | Kim | |
| 2004/0258012 A1 | 12/2004 | Ishii | |
| 2004/0264407 A1 | 12/2004 | Tang et al. | |

(Continued)

FOREIGN PATENT DOCUMENTS

| | | |
|---|---|---|
| WO | 2012170046 | 12/2012 |
| WO | 2012170062 | 12/2012 |

(Continued)

OTHER PUBLICATIONS

International Search Report and Written Opinion—PCT/US2011/054977—ISA/EPO—Jan. 31, 2012, 7 pages.

(Continued)

*Primary Examiner* — Chuong A Ngo
(74) *Attorney, Agent, or Firm* — DeLizio Gilliam, PLLC

(57) ABSTRACT

A TDOA positioning system that employs a calculated initial location of a wireless network device can be implemented to minimize sensitivity to the initial location of the wireless network device. For each pair of a plurality of reference network devices, the wireless network device can determine a distance difference between itself and the pair of the plurality of reference network devices based, at least in part, on round trip transit times between the wireless network device and the plurality of reference network devices. The initial location of the wireless network device can be calculated based on a location of each of the plurality of reference network devices. A location of the wireless network device can be estimated based on the calculated initial location of the wireless network device, the distance differences, and the location of each of the plurality of reference network devices.

24 Claims, 8 Drawing Sheets

U.S. PATENT DOCUMENTS

| | | | |
|---|---|---|---|
| 2005/0135257 A1* | 6/2005 | Stephens et al. | 370/241 |
| 2007/0121560 A1 | 5/2007 | Edge | |
| 2007/0296633 A1 | 12/2007 | Yanagihara | |
| 2008/0103696 A1 | 5/2008 | Cheok et al. | |
| 2008/0125161 A1 | 5/2008 | Ergen et al. | |
| 2008/0130604 A1 | 6/2008 | Boyd | |
| 2008/0188236 A1 | 8/2008 | Alles et al. | |
| 2008/0248741 A1 | 10/2008 | Alizadeh-Shabdiz | |
| 2008/0287139 A1 | 11/2008 | Carlson et al. | |
| 2009/0280825 A1 | 11/2009 | Malik et al. | |
| 2010/0130225 A1 | 5/2010 | Alles et al. | |
| 2010/0135178 A1 | 6/2010 | Aggarwal et al. | |
| 2010/0150117 A1 | 6/2010 | Aweya et al. | |
| 2011/0059752 A1 | 3/2011 | Garin et al. | |
| 2011/0117925 A1 | 5/2011 | Sampath et al. | |
| 2011/0136506 A1 | 6/2011 | Stewart | |
| 2011/0188389 A1 | 8/2011 | Hedley et al. | |
| 2011/0244881 A1 | 10/2011 | Bando et al. | |
| 2012/0087272 A1* | 4/2012 | Lemkin et al. | 370/252 |
| 2012/0314587 A1 | 12/2012 | Curticapean | |
| 2012/0315919 A1 | 12/2012 | Hirsch | |
| 2013/0005347 A1 | 1/2013 | Curticapean | |
| 2013/0072217 A1 | 3/2013 | Zhang et al. | |
| 2013/0072219 A1 | 3/2013 | Zhang et al. | |
| 2013/0072220 A1 | 3/2013 | Zhang et al. | |
| 2013/0100850 A1 | 4/2013 | Zhang et al. | |

FOREIGN PATENT DOCUMENTS

| | | |
|---|---|---|
| WO | 2013002812 | 1/2013 |
| WO | 2013043664 | 3/2013 |
| WO | 2013043675 | 3/2013 |
| WO | 2013043681 | 3/2013 |
| WO | 2013043685 | 3/2013 |
| WO | 2013059636 A1 | 4/2013 |

OTHER PUBLICATIONS

U.S. Appl. No. 13/155,037, Curticapean; Florean.
U.S. Appl. No. 13/158,029, Hirsch; Olaf J.
U.S. Appl. No. 13/170,353, Curticapean; Florean.
U.S. Appl. No. 13/236,172, Zhang; Xiaoxin et al.
U.S. Appl. No. 13/236,232, Zhang, Xiaoxin et al.
U.S. Appl. No. 13/236,259, Zhang; Xiaoxin et al.
U.S. Appl. No. 13/278,642, Zhang; Xiaoxin et al.
U.S. Appl. No. 13/315,174, Zhang; Xiaoxin et al.
International Search Report and Written Opinion—PCT/US2011/043781—ISA/EPO—Nov. 17, 2011, 7 pages.
International Search Report and Written Opinion—PCT/US2011/046074—ISA/EPO—Dec. 16, 2011, 10 pages.
U.S. Appl. No. 13/158,029 Office Action, Oct. 3, 2012, 18 pages.
U.S. Appl. No. 13/236,172 Office Action, Jun. 7, 2012, 25 pages
U.S. Appl. No. 13/236,208 Office Action, Nov. 7, 2012, 14 pages.
U.S. Appl. No. 13/236,232 Office Action, Oct. 11, 2012, 13 pages.
U.S. Appl. No. 13/236,172 Office Action, Jan. 3, 2013, 25 pages.
Foy, W.H., "Position-Location Solutions by Taylor-Series Estimation", IEEE Transactions on Aerospace and Electronic Systems, IEEE Service Center, Piscataway, NJ, US, vol. AES-10, No. 2, Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10th International Conference on, IEEE, Sep. 1, 2011, pp. 104-110, XP932136955, DOI : 10.1109/CIS.2011.6169143 ISBN: 978-1-4673-0687-4 Abstract Sections I-III.
Shen, G., et al., "Performance comparison of TOA and TDOA based location estimation algorithms in LOS environment", (WPNC '08) 5th, IEEE, Mar. 27, 2008, pp. 71-78, XP031247832, ISBN: 978-1-4244-1798-8 Section II (TOA Based Location Estimation Algorithms}: "C. Taylor Series Method".
"PCT Application No. PCT/US12/56017 International Search Report", 14 pages, Jan. 3, 2013.
"PCT Application No. PCT/US12/56053 International Search Report", Jan. 3, 2013, 13 pages.
"PCT Application No. PCT/US2012/056036 International Search Report", Jan. 3, 2013, 13 pages.
"PCT Application No. PCT/US2012/056046 International Search Report", Jan. 3, 2013, 13 pages.
Gholami M.R., et al., "Positioning Algorithms for Cooperative Networks in the Presence of an Unknown Turn-Around Time," 2011 IEEE 12th International Workshop on Signal Processing Advances in Wireless Communications, 2011, pp. 166-170.
International Search Report and Written Opinion—PCT/US2012/056053—ISA/EPO—Jan. 3, 2013.
PCT Application No. PCT/US2012/068543 International Search Report, Feb. 15, 2013, 15 pages.
YU K., et al., "TOA-based distributed localisation with unknown internal delays and clock frequency offsets in wireless sensor networks," IET Signal Processing, 2009, vol. 3 (2), pp. 106-118.
"PCT Application No. PCT/US2012/061081 International Search Report", Mar. 27, 2013 , 11 pages.
"U.S. Appl. No. 13/155,037 Office Action", Apr. 3, 2013 , 20 pages.

* cited by examiner

TIME DIFFERENCE OF ARRIVAL BASED POSITIONING SYSTEM

BACKGROUND

Embodiments of the inventive subject matter generally relate to the field of wireless communication and, more particularly, to a time difference of arrival (TDOA) positioning system.

A wireless communication device can use various position estimation techniques to determine an unknown location of the wireless communication device based on communicating with a plurality of reference wireless communication devices with known locations. For example, the wireless communication device can employ time of arrival (TOA) positioning techniques that use the travel time of radio signals from the wireless communication device to the reference wireless communication devices to determine the unknown location. As another example, the wireless communication device can employ time difference of arrival (TDOA) positioning techniques that use the difference between the travel times of radio signals from the wireless communication device to a plurality of the reference wireless communication devices to determine the unknown location.

SUMMARY

Various embodiments of a time difference of arrival positioning mechanism are disclosed. In one embodiment, a wireless network device of a communication network determines a round trip transit time between the wireless network device and each of a plurality of reference wireless network devices of the communication network. For each pair of the plurality of reference wireless network devices, a difference in a distance between the wireless network device and the pair of the plurality of reference wireless network devices is determined based, at least in part on the round trip transit time between the wireless network device and each of the plurality of reference wireless network devices of the communication network. An initial location of the wireless network device is calculated based, at least in part, on a location of each of the plurality of reference wireless network devices. A location of the wireless network device is estimated based, at least in part, on the initial location of the wireless network device, the difference in the distance between the wireless network device and each pair of the plurality of reference wireless network devices, and the location of each of the plurality of reference wireless network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
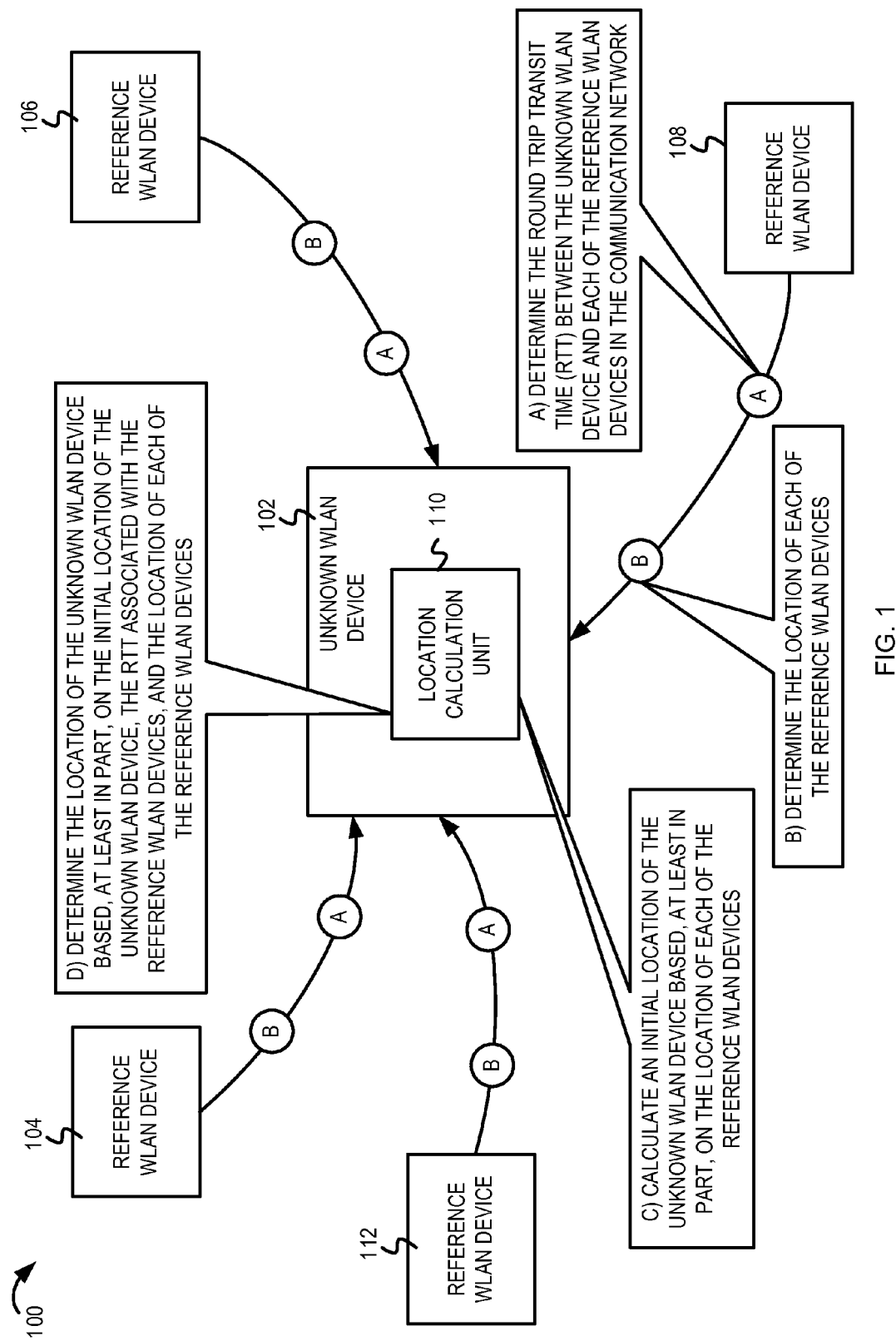
FIG. 1 is an example block diagram illustrating a mechanism for determining the unknown location of a network device in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to wireless local area network (WLAN) devices (e.g., 802.11n compatible devices) executing the location estimation techniques described herein, embodiments are not so limited. In other embodiments, various other devices and standards (e.g., WiMAX) can execute the location estimation techniques. In other instances, well-known instruction instances, protocols, structures, and techniques have not been shown in detail in order not to obfuscate the description.

A network device associated with an unknown location ("unknown network device") typically uses a TDOA based positioning algorithm or a TOA based positioning algorithm to determine its location based on a plurality of reference network devices. A conventional TDOA positioning algorithm typically determines, for each pair of reference network devices, the difference between the distance from the unknown network device to one reference network device of the pair of reference network devices and the distance from the unknown network device to the other reference network device of the pair of reference network devices. This above described distance difference may be referred to herein as the difference in distances between the unknown network device and each pair of reference network devices. The conventional TDOA positioning algorithm uses, as an input, an arbitrarily selected initial location of the unknown network device and the difference in distances between the unknown network device and each pair of reference network devices to iteratively calculate the location of the unknown network device. Typically, the initial location of the unknown network device is an all zero value (e.g., where the X, Y, and Z coordinates are zero) or a randomly selected value. However, the conventional TDOA positioning algorithm is usually sensitive to the initial location of the unknown network device. Employing a randomly selected value or a zero value for the initial location can render the conventional TDOA positioning algorithm unsolvable (e.g., by making the value of one or more determinants approach zero or infinity), and can result in the conventional TDOA positioning algorithm not converging to an appropriate solution (i.e., the location of the unknown network device).

Likewise, the conventional TOA positioning algorithm uses the measured distances between the unknown network device and each of the reference network devices, an arbitrarily selected initial location of the unknown network device, and a distance calibration constant to determine the location of the unknown network device. The distance calibration constant can be indicative of the difference between the estimated and the measured distances to the reference network devices (e.g., because of internal processing at the reference network devices). The conventional TOA positioning mechanism typically uses a known distance calibration constant to determine the location of the unknown network device; however, if the distance calibration constant is not known, it may arbitrarily select the distance calibration constant (or use a zero value). The conventional TOA positioning algorithm is usually sensitive to the distance calibration constant. Therefore, not knowing or randomly selecting the distance calibration constant can result in poor performance of the TOA positioning algorithm, can result in the TOA positioning algorithm not converging to the location of the unknown network device, and/or can result in the TOA positioning algorithm converging to the wrong solution.

In some implementations, a new TDOA positioning system that employs a calculated (rather than an arbitrarily selected) initial location of the unknown network device can be implemented to minimize the sensitivity of the conventional TDOA positioning algorithm to the initial location of the unknown network device. The initial location of the unknown network device can be calculated based, at least in part, on the known locations of the reference network devices. The new TDOA positioning system can determine the location of the unknown network device based, at least in part, on the calculated initial location of the unknown network device and the differences in distances between the unknown network device and each pair of the reference network devices. Furthermore, the new TDOA positioning system can execute a single iteration (rather than multiple iterations) to calculate the location of the unknown network device (as will be further described below with reference to FIGS. 1-4). Calculating the initial location of the unknown network device (based on executing a single iteration) can mitigate location sensitivity issues and can ensure convergence of the new TDOA positioning system in determining the location of the unknown network device. Employing the calculated initial location (rather than an arbitrarily guessed initial location) can also improve the positioning accuracy. Moreover, by executing only a single iteration to determine the location of the unknown network device, the new TDOA positioning system can minimize the resources and the time consumed to calculate the location of the unknown network device.

In another implementation, a hybrid TDOA-TOA positioning system can be employed to improve the performance of estimating the location of the unknown network device. As part of the hybrid TDOA-TOA positioning system, the new TDOA positioning system (described above) can execute a single iteration to determine a TDOA location of the unknown network device. In the hybrid TDOA-TOA positioning system, the TDOA location of the unknown network device can be referred to as an "intermediate location of the unknown network device." The TDOA location (i.e., the intermediate location) of the unknown network device (along with the location of the reference network devices and the measured distance to each of the reference WLAN devices) can then be used to calculate the distance calibration constant and a second intermediate location of the unknown network device. In accordance with the hybrid TDOA-TOA positioning system, a TOA positioning algorithm can be iteratively executed based, at least in part, on the calculated distance calibration constant and the second intermediate location to estimate the location ("estimated location") of the unknown network device (as will be further described below with reference to FIG. 1 and FIGS. 5-7). Such a hybrid TDOA-TOA positioning system can minimize the sensitivity to the initial location of the unknown network device and the distance calibration constant. By calculating (rather than guessing) the distance calibration constant, the hybrid TDOA-TOA positioning system can also minimize positioning error associated with determining the location of the unknown network device and can increase positioning accuracy of the unknown network device. The hybrid TDOA-TOA positioning system can also improve the overall performance of the unknown network device.

FIG. 1 is an example block diagram illustrating a mechanism for determining the unknown location of a network device in a wireless communication network 100. The wireless communication network 100 comprises a WLAN device 102 with an unknown location ("unknown WLAN device") and four reference WLAN devices 104, 106, 108, and 112. The unknown WLAN device 102 comprises a location calculation unit 110. In some implementations, the location calculation unit 110 may be implemented in a communication unit of the unknown WLAN device 102 that implements protocols and functionality to enable WLAN communication in the wireless communication network 100. It is noted that although not depicted in FIG. 1, one or more of the reference WLAN devices 104, 106, 108, and 112 can also comprise a location calculation unit and corresponding functionality for determining their respective location (i.e., when their location is unknown). In some implementations, the unknown WLAN device 102 and the reference WLAN devices 104, 106, 108, and 112 can each be electronic devices with WLAN communication capabilities, such as a laptop computer, a tablet computer, a mobile phone, a smart appliance, a gaming console, an access point, or other suitable electronic devices. The unknown WLAN device 102 can execute operations to determine the location of the unknown WLAN device 102, as will be described below in stages A-D.

At stage A, the location calculation unit 110 determines the round trip transit time (RTT) between the unknown WLAN device 102 and each of the reference WLAN devices 104, 106, 108, and 112 in the wireless communication network 100. In one implementation, the location calculation unit 110 can transmit one or more control messages to the reference WLAN device 104 and can receive corresponding one or more response control messages (e.g., acknowledgement (ACK) messages) from the reference WLAN device 104. The location calculation unit 110 can also record the time instants at which the control messages were transmitted to and the corresponding response control messages were received from the reference WLAN device 104. The location calculation unit 110 can then calculate the RTT between the unknown WLAN device 102 and the reference WLAN device 104 ("RTT associated with the reference WLAN device") as the elapsed time between transmitting the control messages and receiving the corresponding response control messages, as will further be described in blocks 306-310 of FIG. 3. Likewise, the location calculation unit 110 can also calculate the RTT associated with the reference WLAN device 106, the RTT associated with the reference WLAN device 108, and the RTT associated with the reference WLAN device 112. It is noted that in other implementations, other suitable techniques can be employed to determine the RTT associated with the reference WLAN devices 104, 106, 108, and 112.

At stage B, the location calculation unit 110 determines the location of each of the reference WLAN devices 104, 106, 108, and 112. In some implementations, the location calculation unit 110 can request and receive location coordinates associated with each of the reference WLAN devices 104, 106, 108, and 112. For example, the location calculation unit 110 can transmit a request for the location coordinates in the control messages transmitted at stage A, and can then receive the location coordinates in the response control messages. As another example, the location calculation unit 110 can transmit a location request message (distinct from the control messages transmitted at stage A) to each of the reference WLAN devices, and can then receive a corresponding location response message comprising the location coordinates associated with each of the reference WLAN devices. In another implementation, the location calculation unit 110 can query a centralized server (or can access a predetermined memory location) to determine the location coordinates associated with the reference WLAN devices 104, 106, 108, and 112. In another implementation, the reference WLAN devices 104, 106, 108, and 112 may broadcast their respective location coordinates at periodic intervals (e.g., in a beacon message or another suitable control message). The location calculation unit 110 can determine the location coordinates associated with the reference WLAN devices 104, 106, 108, and 112 based on receiving and analyzing the periodically received messages. As part of the location coordinates, the location calculation unit 110 can determine two-dimensional (2-D) coordinates (e.g., X and Y coordinates), three-dimensional (3-D) coordinates (e.g., X, Y, and Z coordinates), latitudes and longitudes, spherical coordinates, and/or other suitable location indicators.

At stage C, the location calculation unit 110 calculates an initial location of the unknown WLAN device 102 based, at least in part, on the location of each of the reference WLAN devices 104, 106, 108, and 112. As one example, the location calculation unit 110 can calculate the initial location of the unknown WLAN device 102 as the average of the known locations of the reference WLAN devices 104, 106, 108, and 112, as will be described in FIGS. 2 and 3. The location calculation unit 110 can use the calculated initial location of the unknown WLAN device 102 as an input to a Taylor series-based TDOA positioning algorithm to determine the location of the unknown WLAN device 102, as will be described below in stage D and FIGS. 2-4. In some implementations (e.g., in a hybrid TDOA-TOA positioning system), the location calculation unit 110 can use the output of the TDOA positioning algorithm (i.e., the intermediate location of the unknown WLAN device) to calculate a second intermediate location of the unknown WLAN device 102 based, at least in part, on a previously calculated location of the unknown WLAN device (generated at the output of the Taylor series-based TDOA positioning algorithm), the known locations of the reference WLAN devices 104, 106, 108, and 112, a distance calibration constant, and the RTT associated with the reference WLAN devices 104, 106, 108, and 112, as will be described below in stage D and in FIGS. 5-7.

At stage D, the location calculation unit 110 determines the location of the unknown WLAN device 102 based, at least in part, on the initial location of the unknown WLAN device 102, the RTT associated with each of the reference WLAN devices 104, 106, 108, and 112, and the location of each of the reference WLAN devices 104, 106, 108, and 112. In some implementations, as will be described in FIGS. 2-4, calculating the location of the unknown WLAN device 102 can be a one-stage process. In this implementation, the location of the unknown WLAN device 102 can be calculated by executing a single iteration of the Taylor series-based TDOA positioning algorithm using at least the calculated initial location of the unknown WLAN device 102 as an input. In some implementations, as will be described in FIGS. 5-7, calculating the location of the unknown WLAN device 102 can be a two-stage process. In this implementation, the location calculation unit 110 can first execute the single iteration of the Taylor series based TDOA positioning algorithm (as described above) and determine a TDOA location of the unknown WLAN device 102. Next, the location calculation unit 110 can determine the estimated location of the unknown WLAN device 102 by iteratively executing a Taylor series-based TOA positioning algorithm using at least the TDOA location of the unknown WLAN device 102 (e.g., the second intermediate location of the unknown WLAN device 102 described above in stage C).

Figure 2:
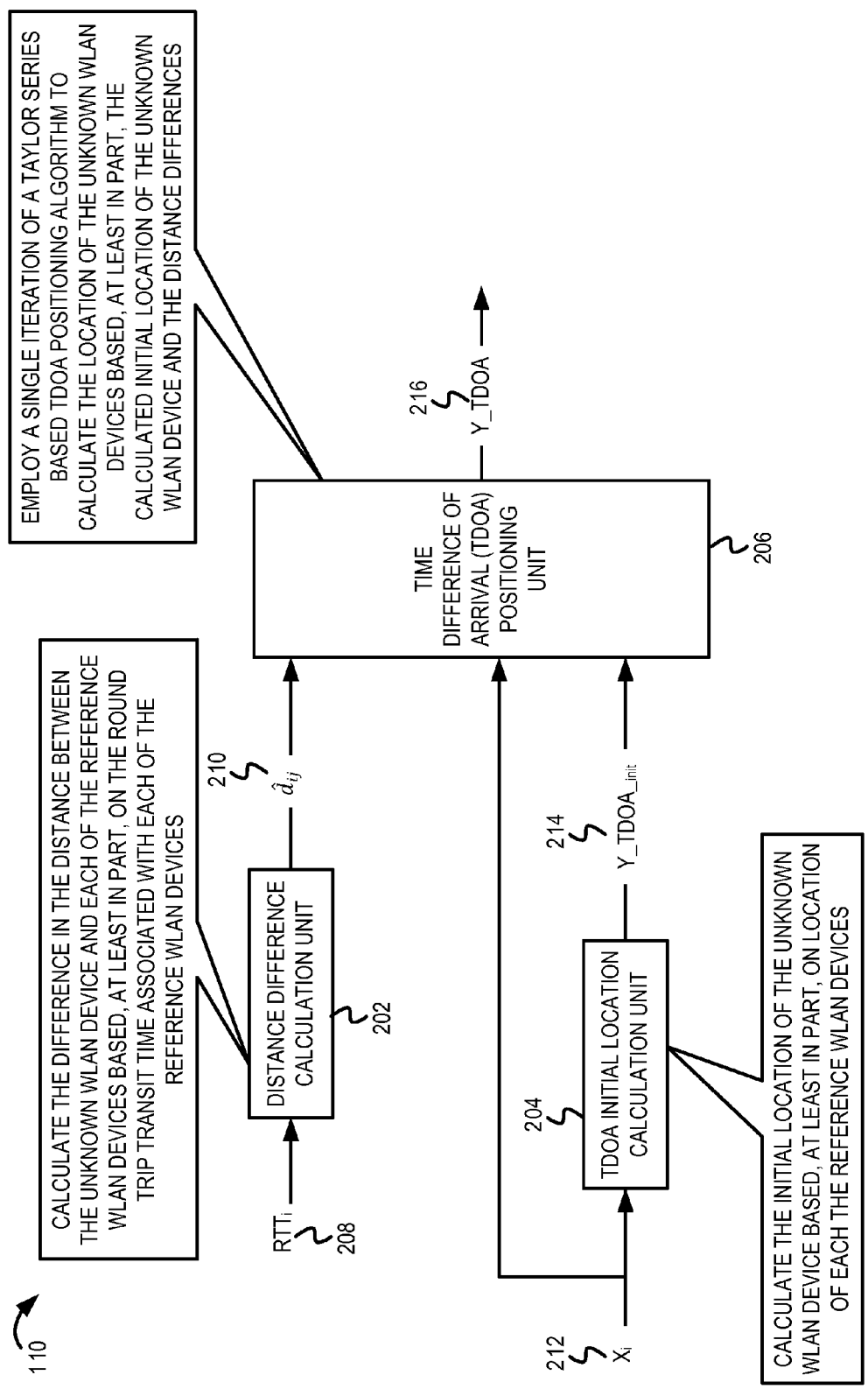
FIG. 2 is an example block diagram of one embodiment of the location calculation unit including a TDOA positioning mechanism.

FIG. 2 is an example block diagram of one embodiment of the location calculation unit 110 including a TDOA positioning mechanism. The location calculation unit 110 comprises a distance difference calculation unit 202, a TDOA initial location calculation unit 204, and a TDOA positioning unit 206. The distance difference calculation unit 202 and the TDOA initial location calculation unit 204 are coupled with the TDOA positioning unit 206.

The distance difference calculation unit 202 can calculate the difference in the distance between the unknown WLAN device 102 and each of the reference WLAN devices 104, 106, 108, and 112 based, at least in part, on the corresponding RTT associated with each of the reference WLAN devices. As depicted in FIG. 2, the distance difference calculation unit 202 takes as an input parameter the measured round-trip transit time (RTT) 208 between the unknown WLAN device 102 and each of the reference WLAN devices 104, 106, 108, and 112. If i represents a counter for the each of the reference WLAN devices and N represents the number of reference WLAN devices in the communication network 100, then the input to the distance difference calculation unit 202 is $RTT_i$ (i.e., $RTT_1, RTT_2, \ldots RTT_N$) as depicted in FIG. 2. The output of the distance difference calculation unit 202 is distance difference 210 ($\hat{d}_{ij}$) in the measured distance between the unknown WLAN device 102 and the $i^{th}$ reference WLAN device and the distance between the unknown WLAN device 102 and the $j^{th}$ reference WLAN device. Thus, if $RTT_i$ and $RTT_j$ represent the RTT associated with the $i^{th}$ reference WLAN device and the $j^{th}$ reference WLAN device respectively and c represents the speed of light, the distance difference $\hat{d}_{ij}$ 210 can be calculated in accordance with Eq. 1.

$$\hat{d}_{ij} = c \times \frac{RTT_i - RTT_j}{2} \qquad \text{Eq. 1}$$

The TDOA initial location calculation unit 204 can calculate the initial location of the unknown WLAN device 102 based, at least in part, on the location 212 of each of the reference WLAN devices 104, 106, 108, and 112. As depicted in FIG. 2, the known locations 212 of the reference WLAN devices 104, 106, 108, and 112 are provided as input parameters to the TDOA initial location calculation unit 204. As described herein, i represents a counter for the reference WLAN devices and $X_i$ 212 represents the location (e.g., also referred to as absolute location, actual location, or real location) of the $i^{th}$ reference WLAN device. In one implementation, the location of the $i^{th}$ reference WLAN device can be represented in the form, $X_i = \{x_i^s, s=0, 1, \ldots, D-1\}$, where D represents the dimension of the coordinate system used to specify the location of the reference WLAN device (e.g., if the location of the reference WLAN devices is specified in terms of a X, Y, and Z coordinates, then D=3), s represents a counter for the dimension of the coordinate system (i.e., the dimension index), and $x_i^s$ represents the value of the $s^{th}$ dimension of the location of the $i^{th}$ reference WLAN device. It is noted that the location of the reference WLAN devices can be expressed using other suitable coordinate system (e.g., Cartesian coordinates, spherical coordinates, geodesic coordinates, etc.). Furthermore, the location of the reference WLAN devices can be expressed in other suitable number of dimensions (e.g., 2-dimensional coordinates, 3-dimensional coordinates, etc.) As depicted in FIG. 2, the output of the TDOA initial location calculation unit 204 is the initial location ($Y_{TDOA_{init}}^s$) 214 of the unknown WLAN device 102. In one implementation, the initial location of the unknown WLAN device 102 can be represented as $Y_{TDOA_{init}} = \{y_{TDOA_{init}}^s\}$, s=0, 1, ..., D−1}, where D represents the dimension of the coordinate system and $y_{TDOA_{init}}^s$ represents the value of the $s^{th}$ dimension of the initial location of the unknown WLAN device 102. In some implementations, the initial location 214 of the unknown WLAN device 102 can be expressed as a function $f(.)$ of the known locations 212 of the reference WLAN devices, as depicted in Eq. 2a. In some implementations, the initial location 214 of the unknown WLAN device 102 can be calculated as an average of the known locations 212 of the reference WLAN devices, as depicted in Eq. 2b. In another implementation, the initial location 214 of the unknown WLAN device 102 can be calculated by maximizing the determinant of a product of matrices generated during the execution of a Taylor series based TDOA positioning algorithm, as depicted in Eq. 2c. Maximizing the expression $\det(B_{TDoA}^T B_{TDoA})$ as depicted in Eq. 2c can ensure that the TDOA positioning algorithm (described below) converges to the location of the unknown WLAN device 102. In Eq. 2c, $B_{TDoA}^T$ represents the transpose of the $B_{TDoA}$ matrix and the $B_{TDoA}$ matrix will further be described below with reference to Exp. 10 of FIG. 2 and with reference to FIG. 3.

$$Y_{TDOA_{init}} = f(X_0, X_1, \ldots X_{N-1}) \qquad \text{Eq. 2a}$$

$$Y_{TDOA_{init}} = f(X_0, X_1, \ldots X_{N-1}) = \frac{1}{N}\sum_{i=0}^{N-1} X_i \qquad \text{Eq. 2b}$$

$$Y_{TDOA_{init}} = f(X_0, X_1, \ldots X_{N-1}) = \max_{Y_{TDOA_{init}}} \{\det(B_{TDoA}^T B_{TDoA})\} \qquad \text{Eq. 2c}$$

It is noted that in other implementations, the TDOA initial location calculation unit 204 can employ other suitable techniques to calculate the initial location 214 of the unknown WLAN device 102. For example, the initial location 214 of the unknown WLAN device 102 can be calculated as a weighted average of the known locations 212 of the reference WLAN devices where the weights are selected based on the confidence of the location of the reference WLAN devices and/or based the distance between the reference WLAN devices and the unknown WLAN device 102. As another example, the initial location 214 of the unknown WLAN device 102 can be calculated as a weighted (or non-weighted) combination of the known locations 212 of only a subset of the reference WLAN devices. However, it is noted that calculating the initial location 214 of the unknown WLAN device 102 (as opposed to randomly selecting or using a zero initial location) can help achieve convergence of the Taylor series based TDOA positioning algorithm.

The TDOA positioning unit 206 can execute a single iteration of the Taylor series based TDOA positioning algorithm to calculate the location 216 of the unknown WLAN device 102 based, at least in part, on the initial location 214 of the unknown WLAN device 102, the distance differences 210, and the locations 212 of the reference WLAN devices. As depicted in FIG. 2, the difference in the measured distances between the unknown WLAN device 102 and each pair of reference WLAN devices is provided as one input to the TDOA positioning unit 206. In other words, for each distinct pair of reference WLAN devices i and j, the distance $\hat{d}_{ij}$ calculated by the distance difference calculation unit 202 (as depicted in Eq. 1) is provided to the TDOA positioning unit 206. The initial location 214 of the unknown WLAN device 102 ($Y_{TDOA_{init}}$) calculated by the TDOA initial location calculation unit 204 is provided as a second input to the TDOA positioning unit 206. Additionally, the known locations 212 ($X_i$) of the reference WLAN devices 104, 106, 108, and 112 are also provided as an input to the TDOA positioning unit 206. The TDOA positioning unit 206 can then execute one iteration of the TDOA positioning algorithm to solve the expression depicted by Eq. 3a and to determine the location ($Y_{TDOA}$) 216 of the unknown WLAN device 102. In accordance with Eq. 3a, the TDOA positioning unit 206 can attempt to identify the value of $Y_{TDOA}$ that minimizes the sum of the estimation error between A) the measured distance difference determined in Eq. 1 based on the RTT associated with each pair of reference WLAN devices and B) the estimated distance difference based on the known locations of the pair of reference WLAN devices. In Eq., 3a, $\|X_i - Y_{TDOA}\|$ represents the estimated distance between the $i^{th}$ reference WLAN device and the unknown WLAN device 102, while $\|X_j - Y_{TDOA}\|$ represents the estimated distance between the $j^{th}$ reference WLAN device and the unknown WLAN device 102. The estimated distance between a reference WLAN device and the unknown WLAN device can be determined based on the actual location of the reference WLAN device and the estimated location ($Y_{TDOA}$) of the unknown WLAN device. The estimated distance between the $i^{th}$ reference WLAN device and the unknown WLAN device 102 can be expressed in accordance with Eq. 3b.

$$Y_{TDOA} = \arg\min_{Y_{TDOA}} \left\{ \sum_{i=0}^{N-1} \sum_{j=0}^{N-1} \left( \hat{d}_{ij} - \|X_i - Y_{TDOA}\| + \|X_j - Y_{TDOA}\| \right) \right\} \qquad \text{Eq. 3a}$$

$$\|X_i - Y_{TDOA}\| = \left[ \sum_{s=0}^{D-1} (x_i^s - y_{TDOA}^s)^2 \right]^{\frac{1}{2}} \qquad \text{Eq. 3b}$$

In some implementations, by assuming that there is no estimation error {i.e., by assuming that ($\hat{d}_{ij} - \|X_i - Y_{TDOA}\| + \|X_j - Y_{TDOA}\|$)=0}, the TDOA positioning unit 206 can simplify Eq. 3a and can instead solve Eq. 4 for all values of i and j to determine the location of the unknown WLAN device 102.

$$\hat{d}_{ij} = \|X_i - Y_{TDOA}\| - \|X_j - Y_{TDOA}\| \qquad \text{Eq. 4}$$

The location 216 of the unknown WLAN device 102 can be expressed as the sum of the initial location 214 of the unknown WLAN device 102 and a location error ($\Delta Y_{TDOA}$), as depicted in Eq. 5. In other words, the location error can represent the difference between the estimated location 216 of the unknown WLAN device 102 and the initial location 214 of the unknown WLAN device 102. In some implementations, the location error $\Delta Y_{TDOA}$ can be represented as $\Delta Y_{TDOA} = \{\Delta Y_{TDOA}^s, s=0, 1, \ldots, D-1\}$, where D represents the dimension of the coordinate system and $\Delta Y_{TDOA}^s$ represents the value of the $s^{th}$ dimension of the location error associated with the unknown WLAN device 102. The TDOA positioning unit 206 can substitute Eq. 5 into Eq. 4 to yield Eq. 6.

$$Y_{TDOA} = Y_{TDOA_{init}} + \Delta Y_{TDOA} \qquad \text{Eq. 5}$$

$$\hat{d}_{ij} = \|X_i - Y_{TDoA_{init}} - \Delta Y_{TDoA}\| - \|X_j - Y_{TDoA_{init}} - \Delta Y_{TDoA}\| \quad \text{Eq. 6}$$

The TDOA positioning unit 206 can then use Taylor series expansion and neglect the second and higher order terms (e.g., because the higher order terms have a zero or negligible value), to yield Eq. 7.

$$\hat{d}_{ij} = \|X_i - Y_{TDoA_{init}}\| - \|X_j - Y_{TDoA_{init}}\| + \\ \sum_{s=0}^{D-1} \left( \frac{x_j^s - y_{TDoA_{init}}^s}{\|X_j - Y_{TDoA_{init}}\|} - \frac{x_i^s - y_{TDoA_{init}}^s}{\|X_i - Y_{TDoA_{init}}\|} \right) \Delta y_{TDoA}^s \quad \text{Eq. 7}$$

The TDOA positioning unit 206 can then extend Eq. 7 for each distinct pair of reference WLAN devices (e.g., all combinations of i and j, where i≠j), and can organize the plurality of equations in matrix form to yield Eq. 8.

$$A_{TDoA} = B_{TDoA} \Delta Y_{TDoA}^T \quad \text{Eq. 8}$$

In one implementation, as described above, $\Delta Y_{TDoA}^T$ is a D×1 column matrix that represents the transpose of the TDOA location error matrix associated with the unknown WLAN device 102. In other words, the TDOA location error matrix ($\Delta Y_{TDoA}$) represents the difference between the estimated location of the unknown WLAN device 102 and the initial location of the unknown WLAN device 102. The TDOA location error matrix can be represented in accordance with Exp. 9a. The TDOA distance error matrix ($A_{TDoA}$) can be an {N(N−1)/2}×1 column matrix, where each row of the TDOA distance error matrix can be represented in accordance with Exp. 9b. Each element of the TDOA distance error matrix can correspond to a unique combination of two of the reference WLAN devices. Each element of the TDOA distance error matrix can represent the difference (or the distance error) between A) the measured difference between the unknown WLAN device and a pair of reference WLAN devices (e.g., based on RTT associated with the pair of the reference WLAN devices as depicted in Eq. 1) and B) the estimated distance difference between the unknown WLAN device and the pair of reference WLAN devices based on the known locations of the pair of reference WLAN devices and the initial location of the unknown WLAN device 102.

$$\Delta Y_{TDoA1} = [\Delta y_{TDoA}^0 \ \Delta y_{TDoA}^1 \ \ldots \ \Delta y_{TDoA}^{D-1}] \quad \text{Exp. 9a}$$

$$\hat{d}_{ij} = \|X_i - Y_{TDoA_{init}}\| + \|X_j - Y_{TDoA_{init}}\| \quad \text{Exp. 9b}$$

The TDOA coefficient matrix ($B_{TDoA}$) can be an {N(N−1)/2}×D matrix, where N represents the number of reference WLAN devices and D represents the dimension of the coordinate system. Each element of the TDOA coefficient matrix can be represented by Exp. 10. The TDOA coefficient matrix can comprise the coefficients of the $\Delta Y_{TDoA}^T$ matrix and can represent the relationship between the transpose of the TDOA location error matrix ($\Delta Y_{TDoA}^T$) and the TDOA distance error matrix ($A_{TDoA}$).

$$\frac{x_j^s - y_{TDoA_{init}}^s}{\|X_j - Y_{TDoA_{init}}\|} - \frac{x_i^s - y_{TDoA_{init}}^s}{\|X_i - Y_{TDoA_{init}}\|} \quad \text{Exp. 10}$$

In one implementation, the dimension (e.g., the value of s) can vary from column to column, while the pair of reference devices under consideration (e.g., the values of i and j, where j>i) can vary from row to row. The dimension (the s value) can remain constant throughout a particular column, while the pair of the reference WLAN devices under consideration can remain constant throughout a particular row. The TDOA positioning unit 206 can then calculate the TDOA location error matrix ($\Delta Y_{TDoA}$) in accordance with Eq. 11. It is noted that in some implementations, prior to evaluating Eq. 11, the TDOA positioning unit 206 may first determine whether the condition $\det(B_{TDoA}^T B_{TDoA}) \neq 0$ is satisfied to ensure convergence of the Taylor series based TDOA positioning algorithm.

$$\Delta y_{TDoA}^T = (B_{TDoA}^T B_{TDoA})^{-1} B_{TDoA}^T A_{TDoA} \quad \text{Eq. 11}$$

After the TDOA positioning unit 206 calculates the location error in accordance with Eq. 11, the TDOA positioning unit 206 can use Eq. 5 to determine the estimated location of the unknown WLAN device (Y TDOA) by summing the location error ($\Delta Y_{TDoA}$) with the initial location 214 of the unknown WLAN device 102 ($Y_{TDoA_{init}}$). In one implementation, the estimated location 216 of the unknown WLAN device 102 can be represented as $Y_{TDoA} = \{y_{TDoA}^s, s=0, 1, \ldots, D-1\}$, where $y_{TDoA}^s$ represents the value of the $s^{th}$ dimension of the location of the unknown WLAN device 102. It is noted that the TDOA positioning unit 206 may execute only one iteration of the operations described herein with reference to Eq. 3a to Eq. 11 to calculate the location of the unknown WLAN device 102.

Figure 3:
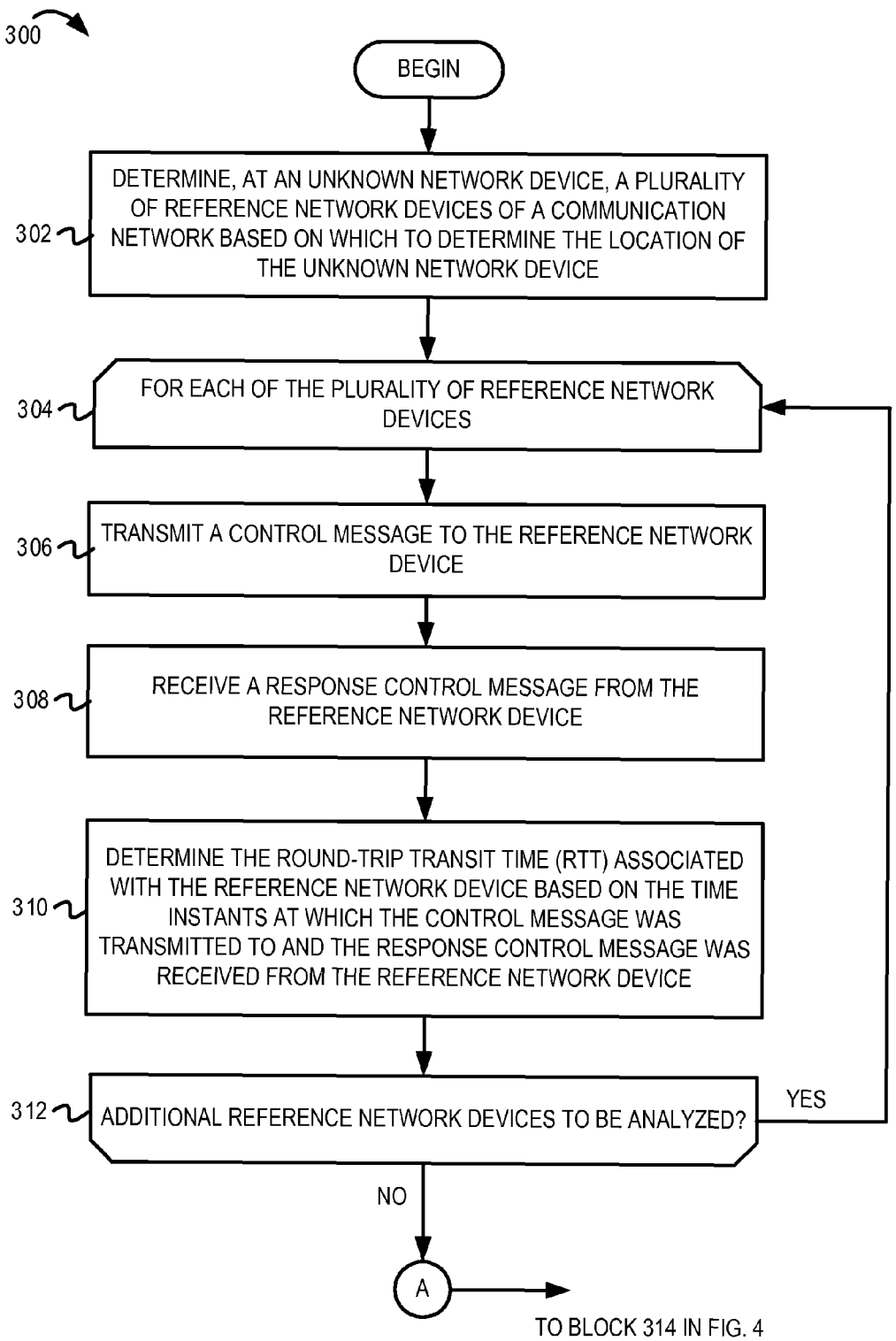
FIG. 3 is a flow diagram illustrating example operations of a TDOA positioning mechanism.
Figure 4:
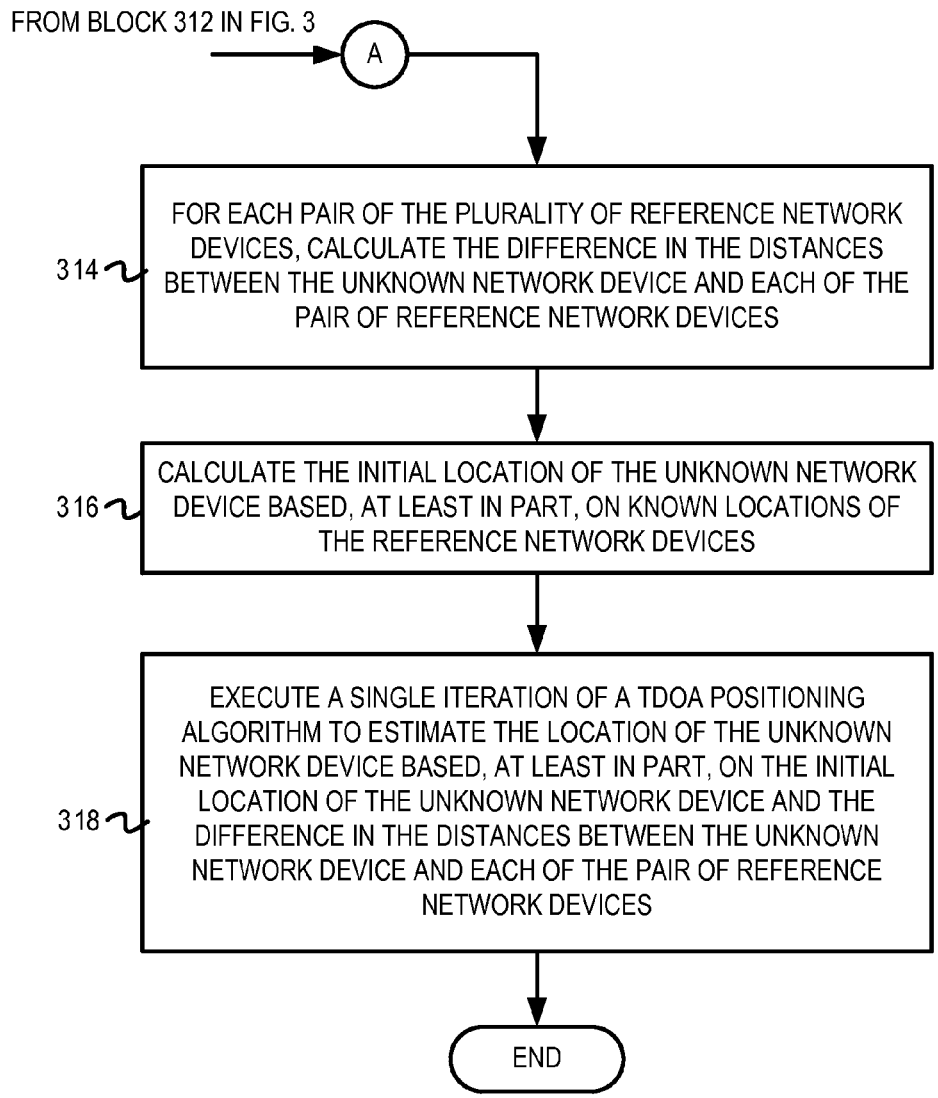
FIG. 4 is a continuation of FIG. 3 and also illustrates example operations of a TDOA positioning mechanism.

FIG. 3 and FIG. 4 depict a flow diagram ("flow") 300 illustrating example operations of a TDOA positioning mechanism. The flow 300 begins at block 302 in FIG. 3.

At block 302, an unknown network device determines a plurality of reference network devices of a communication network based on which to determine the location of the unknown network device. With reference to the example of FIG. 1, the location calculation unit 110 of the unknown WLAN device 102 can identify the reference WLAN devices 104, 106, 108, and 112 based on which to determine the location of the unknown WLAN device 102. In some implementations, the location calculation unit 110 can identify the reference WLAN devices 104, 106, 108, and 112 from a plurality of WLAN devices in the wireless communication network 100 based on analyzing one or more performance measurements associated with the plurality of WLAN devices. For example, location calculation unit 110 can identify N WLAN devices in the wireless communication network 100 with the highest received signal strength indicator (RSSI), the lowest packet error rate (PER), etc. In some implementations, if the wireless communication network 100 comprises a plurality of access points, the access points may advertise (e.g., in a beacon message) their presence/location to other WLAN devices in the wireless communication network 100. The location calculation unit 110 can detect these beacon messages, identify the access points that transmitted the beacon messages, and select at least a subset of the access points as reference WLAN devices (e.g., based on analyzing the performance measurements associated with the beacon messages received from each of the access points). The flow continues at block 304.

At block 304, a loop begins for each of the plurality of reference network devices. For example, the location calculation unit 110 can initiate a loop to determine round trip transit time measurements to each of the reference WLAN devices 104, 106, 108, and 112 as will be further described below in block 306-310. The flow continues at block 306.

At block 306, a control message is transmitted to the reference network device. For example, the location calculation unit 110 can transmit one or more control messages to the reference WLAN device 104. The one or more control messages can comprise an identifier associated with the unknown WLAN device 102, an identifier associated with the reference WLAN device 104, and a suitable payload (e.g., a predetermined combination of symbols, a NULL payload, etc.). The location calculation unit 110 can also record the time instant at which the one or more control messages were transmitted to the reference WLAN device 104. The flow continues at block 308.

At block 308, a response control message is received from the reference network device. For example, the location calculation unit 110 can receive one or more response control messages from the reference WLAN device 104. The one or more response control messages can be WLAN acknowledgment (ACK) messages or any suitable messages that indicate receipt of the control messages (transmitted at block 306) at the reference WLAN device 104. The location calculation unit 110 can also record the time instant at which the one or more response control messages were received at the unknown WLAN device 102. The flow continues at block 310.

At block 310, the round-trip transit time (RTT) associated with the reference network device is determined. In one implementation, the location calculation unit 110 can determine the RTT associated with the reference WLAN device 104 based on the time instants at which the control message was transmitted to the reference WLAN device 104 (recorded at block 306) and the time instant at which the response control message was received from the reference network device 104 (recorded at block 308). The location calculation unit 110 can compute the RTT associated with the reference WLAN device 104 by subtracting the time instant at which the control message was transmitted from the time instant at which the response control message was received. It is noted that in other implementations, the location calculation unit 110 can employ other suitable techniques to determine the RTT associated with the reference WLAN device 104. The flow continues at block 312.

At block 312, it is determined whether additional reference network devices are to be analyzed. For example, the location calculation unit 110 can determine whether there are additional reference WLAN devices to be analyzed. If it is determined that additional reference WLAN devices are to be analyzed, the flow loops back to block 304, where the location calculation unit 110 can identify the next reference WLAN device and determine the RTT associated with the next reference WLAN device. After all the reference WLAN devices have been analyzed, the flow continues at block 314 in FIG. 4.

At block 314, for each pair of the plurality of reference network devices, the difference in the distances between the unknown network device and each of the pair of reference network devices is calculated. For example, the location calculation unit 110 (e.g., the distance difference calculation unit 202 of FIG. 2) can determine the difference in the distances between the unknown WLAN device 102 and each of the pair of reference WLAN devices. With reference to FIG. 1, the distance difference calculation unit 202 can identify six pairs of reference WLAN devices—a first pair of reference WLAN devices 104 and 106, a second pair of reference WLAN devices 104 and 108, a third pair of reference WLAN devices 104 and 112, a fourth pair of reference WLAN devices 106 and 108, a fifth pair of reference WLAN devices 106 and 112, and a sixth pair of reference WLAN devices 108 and 112. Calculating the difference in the distance between the unknown WLAN device 102 and the pair of reference WLAN devices 104 and 106 comprises calculating the difference between A) the distance between the unknown WLAN device 102 and the reference WLAN device 104 and B) the distance between the unknown WLAN device 102 and the reference WLAN device 106. As described above with reference to Eq. 1 of FIG. 2, to calculate the difference in the distance between the unknown WLAN device 102 and the pair of reference WLAN devices 104 and 106, the distance difference calculation unit 202 can determine the difference between the RTT associated with the reference WLAN device 104 and the RTT associated with the reference WLAN device 106. The flow continues at block 316.

At block 316, the initial location of the unknown network device is calculated based, at least in part, on known locations of the reference network devices. For example, location calculation unit 110 (e.g., the TDOA initial location calculation unit 204 of FIG. 2) can calculate the initial location of the unknown WLAN device 102. As described above with reference to Eq. 2a, the initial location of the unknown WLAN device 102 can be calculated as a function of the location of the reference WLAN devices. In some examples, as described above in Eq. 2b, the initial location of the unknown WLAN device 102 can be calculated as an average of the locations of the reference WLAN devices. In other examples, as described above in Eq. 2c, the initial location of the unknown WLAN device 102 can be calculated as another suitable weighted (or non-weighted) combination of the locations of the reference WLAN devices. More specifically, with reference to Eq. 2c and Eq. 8 of FIG. 2, a TDOA coefficient matrix ($B_{TDoA}$) can be calculated as the product of a TDOA distance error matrix ($A_{TDoA}$) and the inverse of the transpose of a TDOA location error matrix ($\Delta Y_{TDoA}^T$). In other words, the location calculation unit 110 can determine the TDOA location error matrix ($\Delta Y_{TDoA}^T$) such that each element of the TDOA location error matrix represents the difference between a coordinate of the estimated location of the unknown WLAN device (e.g., the estimated X-coordinate) and an initial location coordinate of the initial location of the unknown WLAN device 102 (e.g., the X-coordinate of the initial location of the unknown WLAN device 102). The location calculation unit 110 can calculate the TDOA distance error matrix ($A_{TDoA}$) in accordance with Exp. 9b. The location calculation unit 110 can then calculate the TDOA coefficient matrix ($B_{TDoA}$) as, $B_{TDoA} = A_{TDoA}(\Delta Y_{TDoA}^T)^{-1}$. The location calculation unit 110 can calculate the initial location of the wireless network device based, at least in part, on maximizing the determinant of the product of the $B_{TDoA}$ matrix and a transpose of the $B_{TDoA}$ matrix, as depicted in Eq. 2b. The flow continues at block 318.

At block 318, a single iteration of a TDOA positioning algorithm is executed to calculate the location of the unknown network device based, at least in part, on the initial location of the unknown network device and the difference in the distance between the unknown network device and each of the pair of reference network devices. For example, the location calculation unit 110 (e.g., the TDOA positioning unit 206 of FIG. 2) can execute a single iteration of a Taylor series based TDOA positioning algorithm to calculate the location of the unknown WLAN device 102. As described above in Eq. 3a-Eq. 11, the TDOA positioning unit 206 can use the calculated initial location of the unknown WLAN device 102 (determined at block 316), the difference in distances to each pair of reference WLAN devices (determined at block 314), and the known locations of the reference WLAN devices as inputs to execute a single iteration of the Taylor series based TDOA positioning algorithm and to calculate the location of the unknown WLAN device 102. It is noted that in other embodiments, the TDOA positioning unit 206 can execute other suitable techniques to determine the location of the unknown WLAN device 102 based, at least in part, on the calculated initial location of the unknown WLAN device 102 (e.g., as will be further described below). From block 318, the flow ends.

Figure 5:
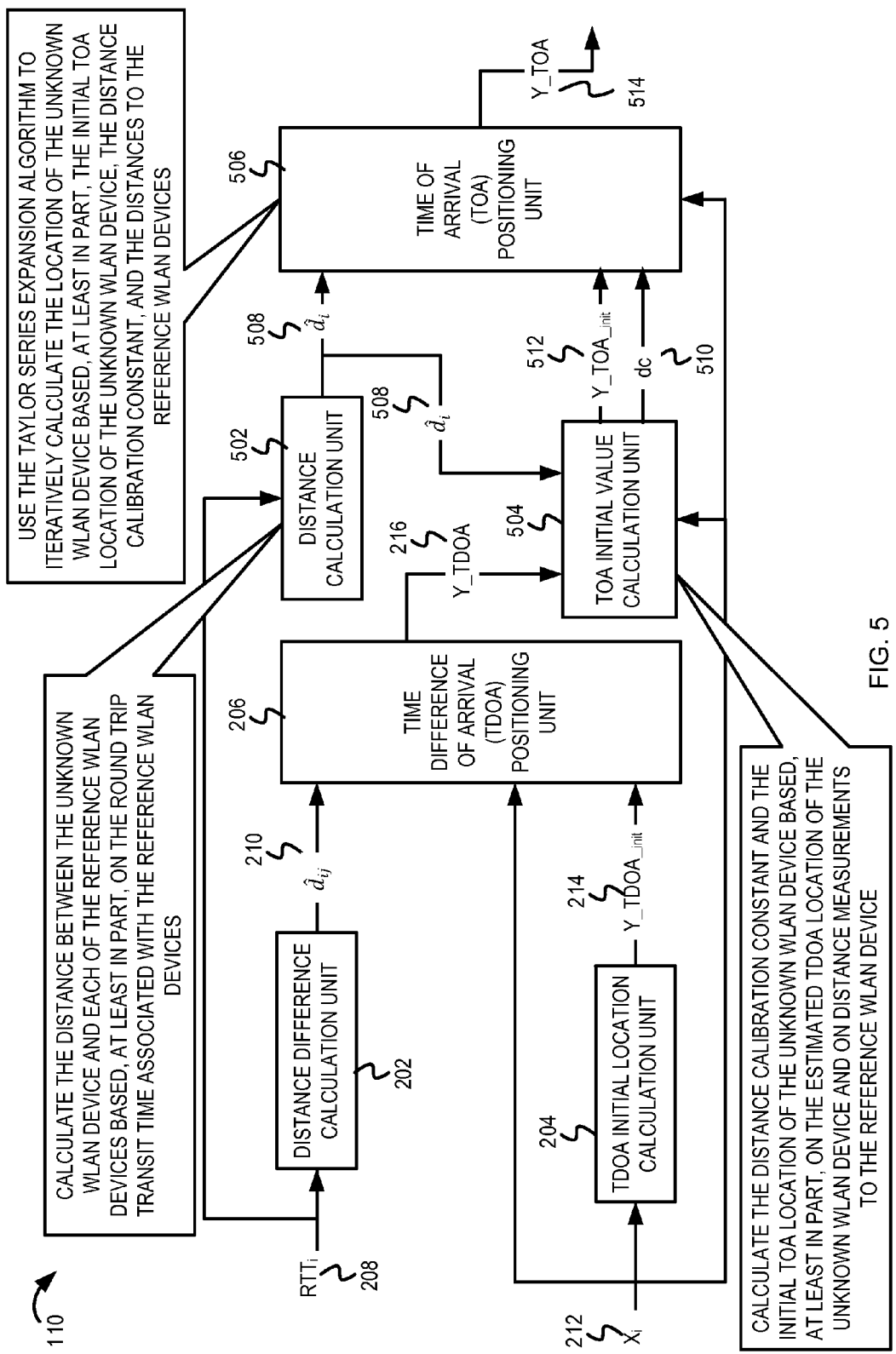
FIG. 5 is an example block diagram of one embodiment of the location calculation unit 110 including a hybrid TDOA-TOA positioning mechanism.

FIG. 5 is an example block diagram of one embodiment of the location calculation unit 110 including a hybrid TDOA-TOA positioning mechanism. The location calculation unit 110 comprises the distance difference calculation unit 202, the TDOA initial location calculation unit 204, and the TDOA positioning unit 206 previously described in FIGS. 2-4. Additionally, the location calculation unit 110 also comprises a distance calculation unit 502, a TOA initial value calculation unit 504, and a TOA positioning unit 506. As shown in the example of FIG. 5, the distance difference calculation unit 202 and the TDOA initial location calculation unit 204 are coupled with the TDOA positioning unit 206. The TDOA positioning unit 206 and the distance calculation unit 502 are coupled with the TOA initial value calculation unit 504. The distance calculation unit 502 and the TOA initial value calculation unit 504 are coupled with the TOA positioning unit 506.

The distance difference calculation unit 202 can calculate the difference 210 in the distance between the unknown WLAN device 102 and each pair of the reference WLAN devices 104, 106, 108, and 112 based, at least in part, on the corresponding RTT 208 associated with each of the reference WLAN devices, as described above in accordance with Eq. 1 of FIG. 2. The TDOA initial location calculation unit 204 can calculate the initial location 214 of the unknown WLAN device 102 based, at least in part, on the location 212 of each of the reference WLAN devices 104, 106, 108, and 112, as described above in accordance with Eq. 2a, Eq. 2b, and Eq. 2c of FIG. 2. The TDOA positioning unit 206 can employ a single iteration of the Taylor series based TDOA positioning algorithm to estimate the TDOA location 216 of the unknown WLAN device 102 based, at least in part, on the initial location 214 of the unknown WLAN device 102 and the distance differences 210, as described above in accordance with Eq. 3a-Eq. 11 of FIG. 2. In the hybrid TDOA-TOA positioning mechanism described below in FIGS. 5-7, the TDOA location 216 of the unknown WLAN device 102 may be referred to as an "intermediate location of the unknown WLAN device."

The distance calculation unit 502 can calculate the distance between the unknown WLAN device 102 and each of the reference WLAN devices 104, 106, 108, and 112 based, at least in part, on the corresponding RTT 208 associated with the reference WLAN devices 104, 106, 108, and 112. As depicted in FIG. 5, the distance calculation unit 502 uses, as an input parameter, the measured RTT 208 associated with each of the reference WLAN devices 104, 106, 108, and 112. If i represents the counter for the each of the reference WLAN devices and N represents the number of reference WLAN devices in the communication network 100, then the input to the distance calculation unit 502 is $RTT_i$ (i.e., $RTT_1$, $RTT_2$, . . . $RTT_N$) as depicted in FIG. 5. The output of the distance calculation unit 502 is the measured distance 508 ($\hat{d}_i$) between the unknown WLAN device 102 and each of the reference WLAN devices as depicted in Eq. 12, where c represents the speed of light.

$$\hat{d}_i = c \times \frac{RTT_i}{2} \qquad \text{Eq. 12}$$

It is noted that the actual distance ($d_i$) between the unknown WLAN device 102 and the $i^{th}$ reference WLAN device can be represented as the sum of a distance calibration constant ($d_c$) and the measured distance ($\hat{d}_i$) between the unknown WLAN device 102 and the $i^{th}$ reference WLAN device, as depicted in Eq. 13.

$$d_i = \hat{d}_i + d_c \qquad \text{Eq. 13}$$

The distance calibration constant ($d_c$) can represent the difference between the measured distance ($\hat{d}_i$) and the actual distance ($d_i$) and may be indicative of internal processing time (or turnaround time) associated with the reference WLAN device. For example, the distance calibration constant can account for the elapsed time between the reference WLAN device detecting a control message from the unknown WLAN device 102 and the reference WLAN device transmitting a response control message to the unknown WLAN device 102. The distance calibration constant may also depend on the type and configuration of the reference WLAN devices. In some implementations, the distance calibration constant may differ from one reference WLAN device to another, while in other implementations, the distance calibration constant may not differ across reference WLAN devices.

The TOA initial value calculation unit 504 can calculate the distance calibration constant and the initial TOA location of the unknown WLAN device 102 based, at least in part, on the measured distance ($\hat{d}_i$) 508 to each of the reference WLAN devices 104, 106, 108, and 112 (determined by the distance calculation unit 502) and the estimated TDOA location ($Y_{TDOA}$) 216 of the unknown WLAN device 102 (calculated by the TDOA positioning unit 206). Additionally, the locations ($X_i$) 212 of the reference WLAN devices 104, 106, 108, and 112 are provided as input parameters to the TOA initial value calculation unit 504. In the hybrid TDOA-TOA positioning mechanism described below in FIGS. 5-7, the initial TOA location of the unknown WLAN device 102 may be referred to as a "second intermediate location of the unknown WLAN device." Thus, as depicted in FIG. 5, the TOA initial value calculation unit 504 can determine the distance calibration constant ($d_r$) 510 and the second intermediate location ($Y_{TOA_{init}}$) 512 of the unknown WLAN device 102. In some implementations, the TOA initial value calculation unit 504 can calculate the value of the distance calibration constant 510 in accordance with Eq. 14.

$$d_c = \sum_{i=0}^{N-1} \beta_i (\|X_i - Y_{TDOA}\| - \hat{d}_i) \qquad \text{Eq. 14}$$

In Eq. 14, $\beta_i$ represents the weighting factor associated with each of the reference WLAN devices and can be selected so that the weighting factor selection conditions of Exp. 15 are satisfied.

$$\beta_i \geq 0, \text{ for } i = 0, 1, \ldots N-1 \qquad \text{Exp. 15}$$

and $$\sum_{i=0}^{N-1} \beta_i = 1$$

In one example, the weighting factor $\beta_i$ associated with each reference WLAN device can be calculated as the inverse of the number of reference WLAN devices, as depicted by Eq. 16a. In another example, the weighting factor $\beta_i$ associated with each reference WLAN device can be calculated in accordance with Eq. 16b.

$$\beta_i = \frac{1}{N}, i = 0, 1, \ldots, N-1 \quad \text{Eq. 16a}$$

$$\beta_i = \frac{1}{\|X_i - Y_{TDOA}\| \sum_{j=0}^{N-1} \frac{1}{\|X_j - Y_{TDOA}\|}}, \quad \text{Eq. 16b}$$

$$i = 0, 1, \ldots, N-1$$

With reference to Eq. 16b, the weighting factor is determined based on the confidence in the location of and distance measurements to the reference WLAN devices. In other words, the distance ($\|X_i - Y_{TDOA}\|$) between the unknown WLAN device 102 and the $i^{th}$ reference WLAN device can be used to calculate the weighting factor and can be used as an indication of the confidence in the measurements associated with the $i^{th}$ reference WLAN device. For example, if the reference WLAN device 104 is close to the unknown WLAN device 102, then $\|X_i - Y_{TDOA}\|$ has a small value, its inverse has a large value, and consequently, the reference WLAN device 104 is associated with a higher weighting factor (e.g., higher importance). As another example, if the reference WLAN device 108 is far away from the unknown WLAN device 102, then $\|X_i - Y_{TDOA}\|$ has a large value, its inverse has a small value, and consequently, the reference WLAN device 108 is associated with a small weighting factor (e.g., low importance). The factor $$\sum_{j=0}^{N-1} \frac{1}{\|X_j - Y_{TDOA}\|}$$

is a constant multiplicative factor that is the sum of the inverse of the distance between the unknown WLAN device 102 and each of the reference WLAN devices. It is noted that in other implementations, the TOA initial value calculation unit 504 can use other suitable techniques to calculate the weighting factor for each of the reference WLAN devices.

Additionally, the TOA initial value calculation unit 504 can determine the initial TOA location ($Y_{TOA_{init}}$) 512 of the unknown WLAN device 102 as a function g(.) of the estimated TDOA location ($Y_{TDOA}$) 216 of the unknown WLAN device 102 (calculated by the TDOA positioning unit 206) and the locations 210 of the reference WLAN devices, as depicted in Eq. 17a. In some implementations, the initial TOA location 512 of the unknown WLAN device 102 can be calculated as an average of the locations 210 of the reference WLAN devices, as depicted in Eq. 17b. In another implementation, the TDOA location ($Y_{TDOA}$) 216 of the unknown WLAN device 102 (calculated by the TDOA positioning unit 206) can be designated as the initial TOA location 512 of the unknown WLAN device 102, as depicted in Eq. 17c.

$$Y_{TOA_{init}} = g(Y_{TDOA}, X_0, X_1, \ldots X_{N-1}) \quad \text{Eq. 17a}$$

$$Y_{TOA_{init}} = g(Y_{TDOA}, X_0, X_1, \ldots X_{N-1}) = \frac{1}{N} \sum_{i=0}^{N-1} X_i \quad \text{Eq. 17b}$$

$$Y_{TOA_{init}} = g(Y_{TDOA}, X_0, X_1, \ldots X_{N-1}) = Y_{TDOA} \quad \text{Eq. 17c}$$

It is noted that in some implementations, the initial TOA location of the unknown WLAN device 102 can be represented as $T_{TOA_{init}} = \{y_{TOA_{init}}^s, s=0, 1, \ldots, D-1\}$, where D represents the dimension of the coordinate system and $y_{TOA_{init}}^s$ represents the value of the $s^{th}$ dimension of the initial TOA location of the unknown WLAN device 102. It is also noted that in some implementations, the TOA initial value calculation unit 504 can employ other suitable techniques to calculate the initial TOA location 512 of the unknown WLAN device 102. For example, the initial TOA location 512 of the unknown WLAN device 102 can be calculated as a weighted average of the locations of the reference WLAN devices, where the weights are selected based on the confidence of the location of the reference WLAN devices and/or based the distance between the reference WLAN device and the unknown WLAN device 102. As another example, the initial TOA location 512 of the unknown WLAN device 102 can be calculated as a combination of the TDOA location ($Y_{TDOA}$) 216 (i.e., the intermediate location) and the locations of the reference WLAN devices.

The TOA positioning unit 506 can use a Taylor series based TOA positioning algorithm to iteratively calculate the location of the unknown WLAN device 102 based, at least in part, on the initial TOA location 512 of the unknown WLAN device 102, the distance calibration constant 510, and the distances 508 to the reference WLAN devices 104, 106, 108, and 112. As depicted in FIG. 5, for each reference WLAN device i, the distance $d_i$ calculated by the distance calculation unit 502 is provided as one input to the TOA positioning unit 506. The initial TOA location 512 of the unknown WLAN device 102 ($Y_{TOA_{init}}$) and the distance calibration constant ($d_c$) 510 calculated by the TOA initial value calculation unit 504 are also provided as inputs to the TOA positioning unit 506. Additionally, the known locations ($X_i$) 210 of the reference WLAN devices 104, 106, 108, and 112 are also provided as inputs to the TOA positioning unit 506. The TOA positioning unit 506 can then iteratively execute the expression depicted by Eq. 18a to gradually approach the real location ($Y_{TOA}$) 514 of the unknown WLAN device 102 after several iterations. In accordance with Eq. 18a, the TOA positioning unit 506 can attempt to identify the value of $Y_{TOA}$ that minimizes the sum of the estimation error between A) the measured distance to the $i^{th}$ reference WLAN device determined in Eq. 12 based on the RTT associated with the $i^{th}$ reference WLAN devices and B) the estimated distance to the $i^{th}$ reference WLAN device based on the known location of the $i^{th}$ reference WLAN device. In Eq. 18a, $\|X_i - Y_{TOA}\|$ represents the distance between the location $X_i$ of the $i^{th}$ reference WLAN device and the TOA location (to be determined) of the unknown WLAN device and can be expressed in accordance with Eq. 18b.

$$Y_{TOA} = \underset{Y_{TOA}}{\arg\min} \left\{ \sum_{i=0}^{N-1} (\hat{d}_i + d_c - \|X_i - Y_{TOA}\|) \right\} \quad \text{Eq. 18a}$$

$$\|X_i - Y_{TOA}\| = \left[ \sum_{s=0}^{D-1} (x_i^s - y_{TOA}^s)^2 \right]^{\frac{1}{2}} \quad \text{Eq. 18b}$$

In some implementations, by assuming that there is no estimation error {e.g., by assuming that $(\hat{d}_i + d_c - \|X_i - Y_{TOA}\|) = 0$}, the TOA positioning unit 506 can simplify Eq. 18a and can instead solve Eq. 19 for all values of i to determine the location of the unknown WLAN device 102.

$$\hat{d}_i + d_c = \|X_i - Y_{TOA}\| \quad \text{Eq. 19}$$

The location 514 of the unknown WLAN device 102 ($Y_{TOA}$) can be expressed as the sum of the initial location 512 of the unknown WLAN device ($Y_{TOA_{init}}$) and a TOA location error ($\Delta Y_{TOA}$), as depicted in Eq. 20. It is noted that in some implementations, the TOA location error can be represented as $\Delta Y_{TOA}=\{\Delta Y_{TOA}^s, s=0, 1, \ldots, D-1\}$, where $\Delta y_{TOA}^s$ represents the value of the $s^{th}$ dimension of the TOA location error. The TOA positioning unit 506 can substitute Eq. 20 into Eq. 19 to yield Eq. 21.

$$Y_{TOA}=Y_{TOA_{init}}+\Delta Y_{TOA} \quad \text{Eq. 20}$$

$$\hat{d}_i+d_c=\|X_i-Y_{TOA_{init}}-\Delta Y_{TOA}\|, i=0, 1, \ldots, N-1 \quad \text{Eq. 21}$$

The TOA positioning unit 506 can then use Taylor series expansion and neglect the second and higher order terms (e.g., because the higher order terms have a zero or negligible value), to yield Eq. 22. The TOA positioning unit 506 can generate an equation in accordance with Eq. 22 for each of the reference WLAN devices 104, 106, 108, and 112 and can organize the plurality of generated equations in matrix form to yield Eq. 23.

$$\hat{d}_i + d_c = \|X_i - Y_{TOA_{init}}\| + \sum_{s=0}^{D-1}\left(-\frac{x_i^s - y_{TOA_{init}}^s}{\|X_i - Y_{TOA_{init}}\|}\right)\Delta y_{TOA}^s \quad \text{Eq. 22}$$

$$A_{ToA} = B_{ToA}\Delta Y_{TOA}^T \quad \text{Eq. 23}$$

$\Delta Y_{TOA}^T$ is a D×1 column matrix that represents the transpose of the TOA location error matrix associated with the unknown WLAN device 102. In other words, the TOA location error matrix ($\Delta Y_{TOA}$) can represent the difference between the estimated location of the unknown WLAN device 102 and the initial TOA location of the unknown WLAN device 102. The TOA distance error matrix ($A_{ToA}$) can be an N×1 column matrix, where each element (i.e., each row) of the $A_{ToA}$ matrix is represented by Exp. 24 and each row is associated with one of the reference WLAN devices. Each element of the $A_{ToA}$ matrix represents a combination of A) the measured distance between the unknown WLAN device and a reference WLAN device (e.g., based on RTT associated with the reference WLAN device as depicted in Eq. 12), B) the distance calibration constant 512, and C) the estimated distance between the unknown WLAN device and the reference WLAN device based on the known location of the reference WLAN device and the initial TOA location of the unknown WLAN device 102. The TOA coefficient matrix ($B_{ToA}$) can be an N×D matrix, where N represents the number of reference WLAN devices and D represents the dimensions of the coordinate system that is used to specify the location of the reference WLAN devices. Each element of the N×D $B_{TDoA}$ matrix can be represented by Exp. 25.

$$\hat{d}_i + d_c - \|X_i - Y_{TOA_{init}}\| \quad \text{Exp. 24}$$

$$-\frac{x_i^s - y_{TOA_{init}}^s}{\|X_i - Y_{TOA_{init}}\|} \quad \text{Exp. 25}$$

As described above with reference to FIGS. 2 and 5, in one implementation, the dimension (e.g., the value of s) can vary from column to column and can remain constant throughout a particular column. The reference device under consideration (e.g., the value of i) can vary from row to row and can remain constant throughout a particular row. The TOA positioning unit 506 can then calculate the TOA location error $\Delta Y_{TOA}$ in accordance with Eq. 26.

$$\Delta Y_{TOA}^T=(B_{ToA}^T B_{ToA})^{-1}B_{ToA}^T A_{ToA} \quad \text{Eq. 26}$$

Next, the TOA positioning unit 506 can use Eq. 20 to iteratively calculate the location 514 of the unknown WLAN device ($Y_{TOA}$) by summing the TOA location error ($\Delta Y_{TOA}$) with the initial location of the unknown WLAN device 102 ($Y_{TOA_{init}}$). In one implementation, the location 514 of the unknown WLAN device 102 at the output of the TOA positioning unit 506 can be represented as $Y_{TOA}=\{y_{TOA}^s, s=0, 1, \ldots, D-1\}$, where $y_{TOA}^s$ represents the value of the $s^{th}$ dimension of the location of the unknown WLAN device 102.

In the next iteration, the TOA positioning unit 506 can use the output of the TOA positioning unit 506 calculated at the previous iteration as the initial TOA location of the unknown WLAN device 102 at the input of the TOA position unit 506 {i.e., $Y_{TOA_{init}}$ (at next iteration)=$Y_{TOA}$ (at previous iteration)} and use Eq. 20 and Eq. 26 to determine the TOA location error ($\Delta Y_{TOA}^T$) at the next iteration and the location of the unknown WLAN device 102 ($Y_{TOA}$) until the TOA location error is below a threshold error value or until a threshold number of iterations have been executed.

Figure 6:
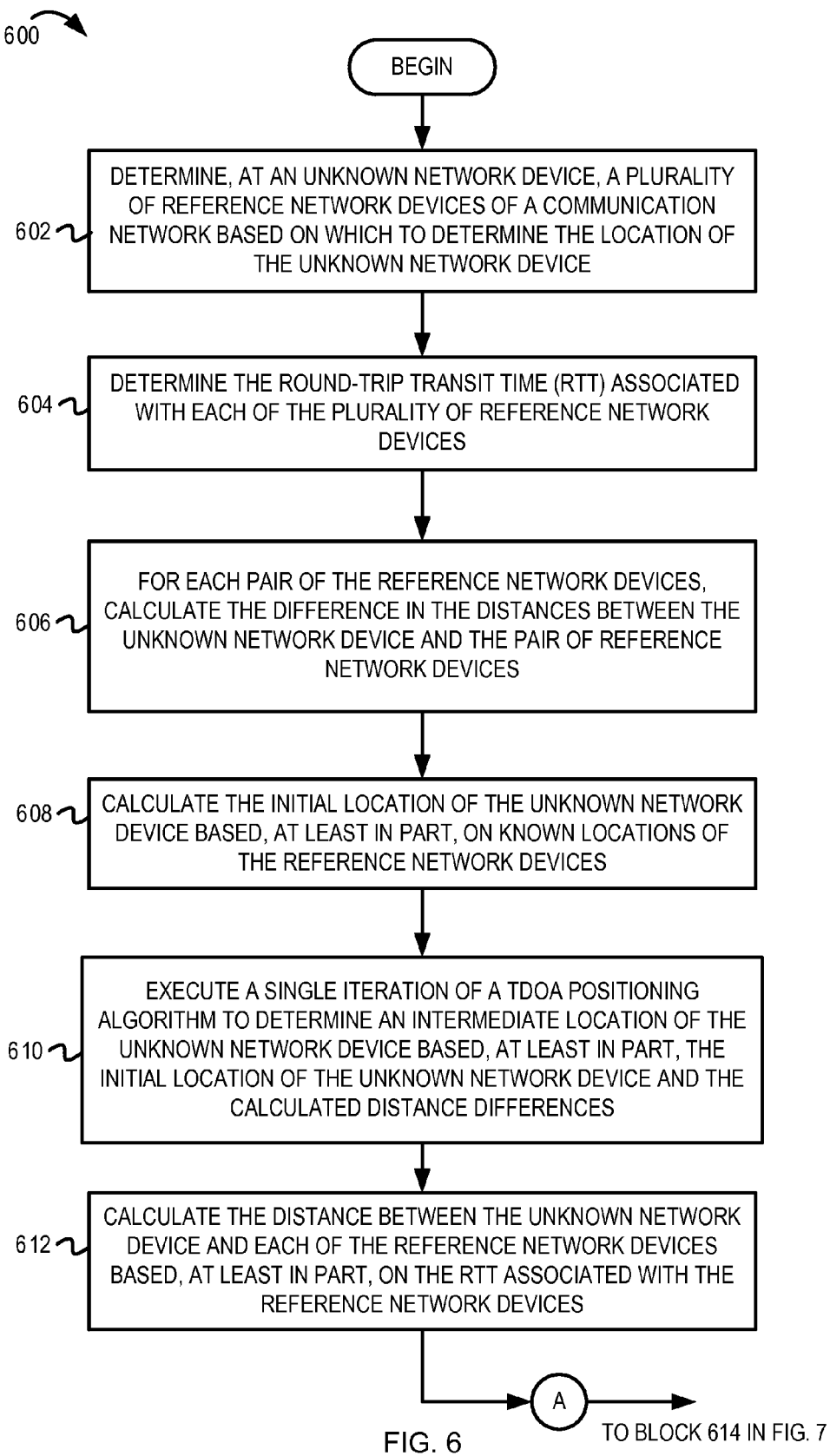
FIG. 6 is a flow diagram illustrating example operations of a hybrid TDOA-TOA positioning mechanism.
Figure 7:
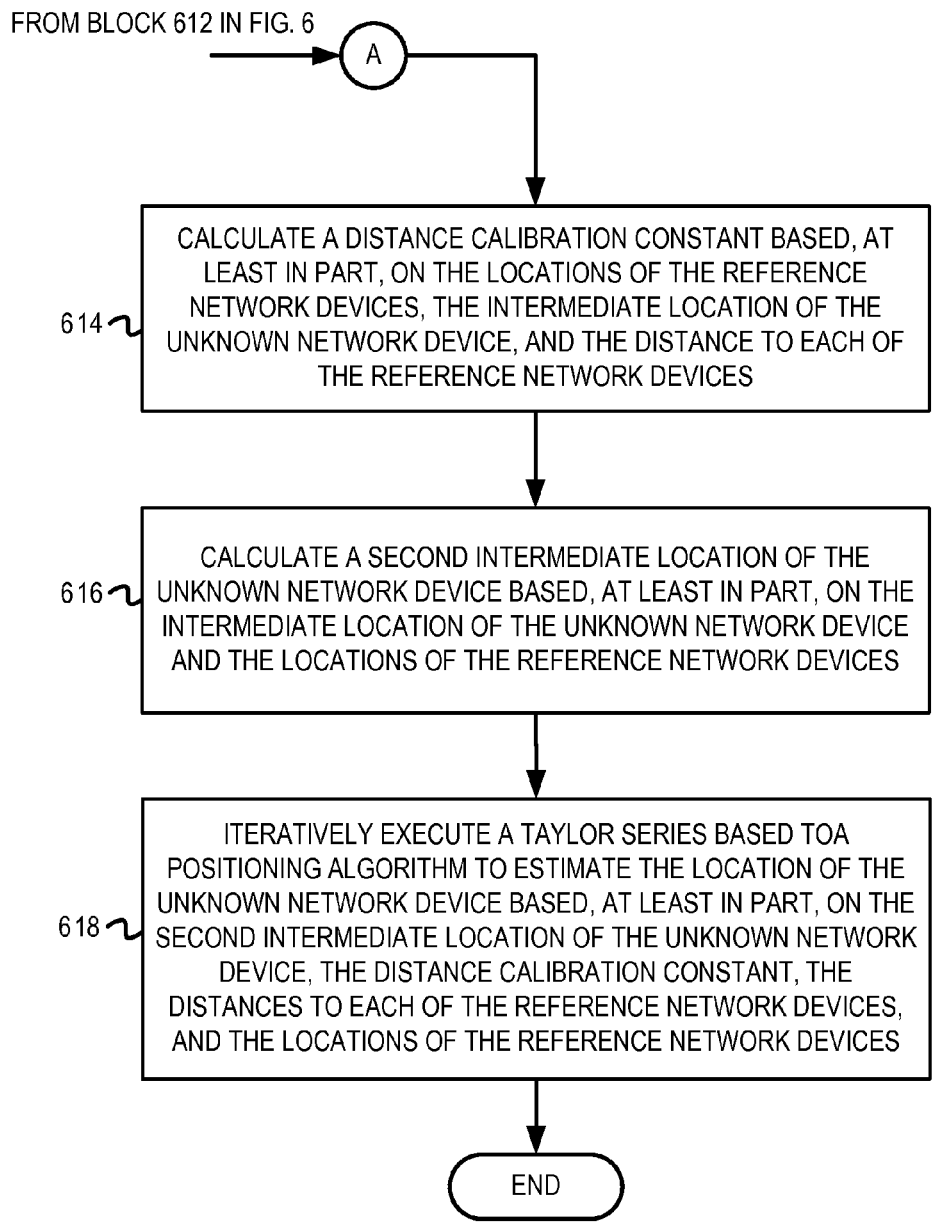
FIG. 7 is a continuation of FIG. 6 and also illustrates example operations of a hybrid TDOA-TOA positioning mechanism.

FIG. 6 and FIG. 7 depict a flow diagram ("flow") 600 illustrating example operations of a hybrid TDOA-TOA positioning mechanism. The flow 600 begins at block 602 in FIG. 6.

At block 602, an unknown network device determines a plurality of reference network devices of a communication network based on which to determine the location of the unknown network device. With reference to the example of FIG. 1, the location calculation unit 110 of the unknown WLAN device 102 can identify the reference WLAN devices 104, 106, 108, and 112 based on which to determine the location of the unknown WLAN device 102. As described above in FIG. 3, the location calculation unit 110 can select the reference WLAN devices 104, 106, 108, and 112 from a plurality of WLAN devices as those that are associated with the best performance measurements (e.g., RSSI, PER, etc.). The flow continues at block 604.

At block 604, the round-trip transit time (RTT) associated with each of the plurality of reference network device is determined. In one implementation, as described above in blocks 306-310 of FIG. 3, the location calculation unit 110 can record the time instants at which one or more control messages were transmitted to each of the reference WLAN devices and the time instants at which the corresponding one or more response control messages were received at the unknown WLAN device 102. Accordingly, the location calculation unit 110 can determine the RTT associated with each of the reference WLAN devices. It is noted that in other implementations, the location calculation unit 110 can employ other suitable techniques to determine the RTT associated with the reference WLAN devices 104, 106, 108, and 112. The flow continues at block 606.

At block 606, for each pair of the reference network devices, the difference in the distances between the unknown network device and the pair of reference network devices is calculated. For example, the location calculation unit 110 (e.g., the distance difference calculation unit 202 of FIG. 5) can determine the difference in the distances between the unknown WLAN device 102 and each of the pair of reference WLAN devices, as described above with reference to Eq. 1 of FIG. 2 and with reference to block 314 of FIG. 3. The flow continues at block 608.

At block 608, the initial location of the unknown network device is calculated based, at least in part, on known locations of the reference network devices. For example, the location calculation unit 110 (e.g., the TDOA initial location calculation unit 204 of FIG. 5) can calculate the initial location of the unknown WLAN device 102, as described above with reference to Eqs. 2a-2c of FIG. 2 and block 316 of FIG. 3. The flow continues at block 610.

At block 610, a single iteration of a TDOA positioning algorithm is executed to calculate the intermediate location of the unknown network device based, at least in part, on the initial location of the unknown network device and the difference in the distance between the unknown network device and each pair of reference network devices. For example, the location calculation unit 110 (e.g., the TDOA positioning unit 206 of FIG. 2) can execute a single iteration of the Taylor series based TDOA positioning algorithm to calculate the intermediate location of the unknown WLAN device 102, as described above in accordance with Eq. 3a to Eq. 11 of FIG. 2. As will be described below, the intermediate location of the unknown WLAN device 102 can be used to calculate the estimated location of the unknown WLAN device 102. It is noted that in other implementations, the TDOA positioning unit 206 can execute other suitable techniques to determine the intermediate location of the unknown WLAN device 102 based, at least in part, on the initial location of the unknown WLAN device 102. The flow continues at block 612.

At block 612, the distance between the unknown network device and each of the reference network devices is calculated based, at least in part, on the RTT associated with the reference network devices. For example, the location calculation unit 110 (e.g., the distance calculation unit 502 of FIG. 5) can calculate the distance between the unknown WLAN device 102 and each of the reference network devices 104, 106, 108, and 112 based, at least in part, on the RTT associated with the corresponding reference WLAN devices as described above with reference to Eq. 12 of FIG. 5. It is noted that in other implementations, the distance calculation unit 502 can use other suitable techniques to determine the distance between the unknown WLAN device 102 and each of the reference WLAN devices. The flow continues at block 614 in FIG. 7.

At block 614, a distance calibration constant is calculated based, at least in part, on the locations of the reference network devices, the intermediate location of the unknown network device, and the distance to each of the reference network devices. For example, the location calculation unit 110 (e.g., the TOA initial value calculation unit 504) can calculate the distance calibration constant 510, as described above with reference to Eq. 14-Eq. 16b of FIG. 5. The distance calibration constant can then be used as an input parameter for determining the estimated location of the unknown WLAN device 102, as will be described in block 618. The flow continues at block 616.

At block 616, a second intermediate location of the unknown network device is calculated based, at least in part, on the intermediate location of the unknown network device and the locations of the reference network devices. For example, the location calculation unit 110 (e.g., the TOA initial value calculation unit 504) can calculate the second intermediate location 512 of the unknown WLAN device 102 as described above in accordance with Eqs 17a-17c of FIG. 5 based, at least in part, on the intermediate location ($Y_{TDOA}$) determined by the TDOA positioning unit 206. It is noted that the TOA initial value calculation unit 504 can use other suitable techniques to determine the second intermediate location 512 of the unknown WLAN device 102. The second intermediate location of the unknown WLAN device 102 can then be used as an input parameter to determine the estimated location of the unknown WLAN device 102, as will be described in block 618. The flow continues at block 618.

At block 618, a TOA positioning algorithm is iteratively executed to calculate the estimated location of the unknown network device based, at least in part, on the second intermediate location of the unknown network device, the distance calibration constant, the distance to each of the reference network devices, and the locations of the reference network devices. For example, as described above with reference to Eq. 18-Eq. 26 of FIG. 5, the location calculation unit 110 (e.g., the TOA positioning unit 506) can execute multiple iterations of a Taylor series based TOA positioning algorithm to calculate the estimated location of the unknown WLAN device 102 based, at least in part, on the second intermediate location of the unknown network device (determined at block 616), the distance calibration constant (determined at block 614), the distance to each of the reference WLAN devices (determined at block 612), and the locations of the reference network devices. From block 618, the flow ends.

It should be understood that FIGS. 1-7 are examples meant to aid in understanding embodiments and should not be used to limit embodiments or limit scope of the claims. Embodiments may perform additional operations, fewer operations, operations in a different order, operations in parallel, and some operations differently. Although the Figures refer to the unknown WLAN device 102 executing the TDOA and/or the hybrid TDOA-TOA positioning techniques described herein to determine the location of the unknown WLAN device 102, embodiments are not so limited. In other embodiments, functionality for determining the location of the unknown WLAN device 102 can be executed on one or more other suitable electronic devices. In some implementations, one or more of the reference WLAN devices, a centralized server, and/or another suitable electronic device can execute some/all of the operations for determining the location of the unknown WLAN device 102. For example, the unknown WLAN device 102 can determine the RTT associated with each of the reference WLAN devices 102, 106, 108, and 112 and can provide the RTT values to the centralized server (or another device to which the processing has been offloaded). The centralized server can then calculate the location of the unknown WLAN device 102 and can communicate the calculated location to the unknown WLAN device 102.

It is noted that in some implementations, the location calculation unit 110 can determine (for each reference WLAN device) multiple RTT measurements and multiple distance measurements. For example, the location calculation unit 110 can transmit a predetermined number of control messages to the reference WLAN device 104 and can receive a corresponding number of response control messages. Accordingly, the location calculation unit 110 can calculate the predetermined number of RTT measurements associated with the reference WLAN device 104. In some implementations, the location calculation unit 110 can determine and use the average RTT value for subsequent operations. In other implementations, the location calculation unit 110 can determine a distance to the reference WLAN device 104, for each of the RTT measurements and can determine and use the average distance to the reference WLAN device 104 for subsequent operations.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
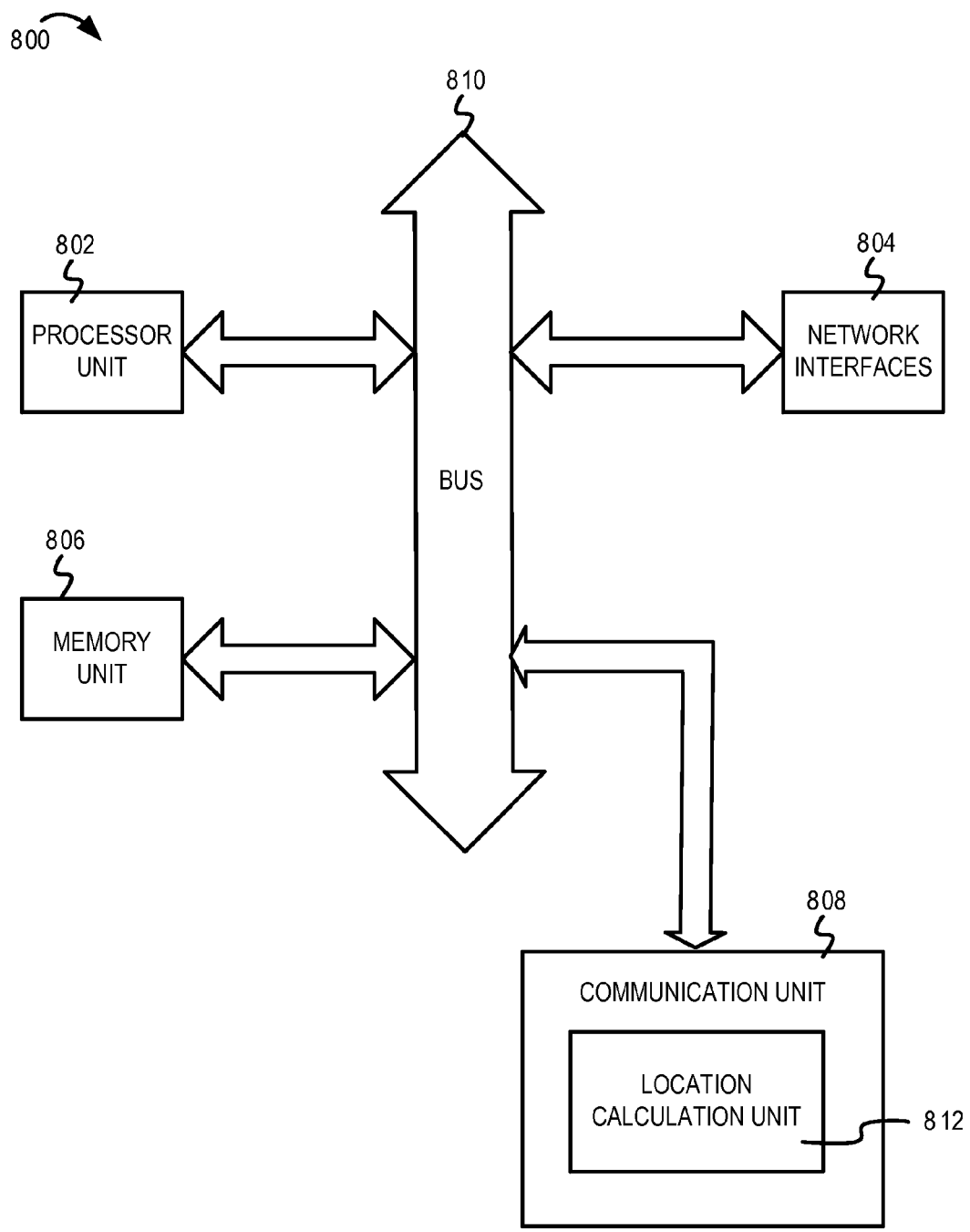
FIG. 8 is a block diagram of one embodiment of an electronic device including a mechanism for determining the location of the electronic device in a wireless communication network.

FIG. 8 is a block diagram of one embodiment of an electronic device 800 including a mechanism for determining the location of the electronic device in a wireless communication network. In some implementations, the electronic device 800 may be one of a laptop computer, a tablet computer, a netbook, a mobile phone, a smart appliance, a gaming console, or other electronic systems comprising wireless communication capabilities. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 800 also includes a communication unit 808. The communication unit 808 comprises a location calculation unit 812. In some implementations, the location calculation unit 812 can execute a single iteration of a TDOA positioning algorithm to determine the location of the electronic device 800 based, at least in part, on the calculated initial location of the electronic device 800, the difference in the distance between the electronic device 800 and each pair of the plurality of reference WLAN devices, and the location of each of the plurality of reference WLAN devices, as described with reference to FIGS. 1-4. In other implementations, the location calculation unit 812 can execute a hybrid TDOA/TOA positioning algorithm to determine the location of the electronic device 800 by iteratively executing a TOA positioning algorithm using at least a previously calculated TDOA location of the unknown WLAN device 102, as described above with reference to FIGS. 1 and 5-7. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the inventive subject matter is not limited to them. In general, techniques for TDOA based positioning or techniques for hybrid TDOA-TOA based positioning as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
  determining, at a wireless network device of a communication network, a round trip transit time between the wireless network device and each of a plurality of reference wireless network devices of the communication network;
  for each pair of the plurality of reference wireless network devices, determining a difference in a distance between the wireless network device and the pair of the plurality of reference wireless network devices based, at least in part, on the round trip transit time between the wireless network device and each of the plurality of reference wireless network devices of the communication network;

determining an initial location of the wireless network device based, at least in part, on a known location of each of the plurality of reference wireless network devices; and estimating a current location of the wireless network device based, at least in part, on the initial location of the wireless network device, the difference in the distance between the wireless network device and each pair of the plurality of reference wireless network devices, and the known location of each of the plurality of reference wireless network devices.

2. The method of claim 1, wherein said estimating the current location of the wireless network device comprises:

executing a single iteration of a Taylor series based time difference of arrival (TDOA) positioning algorithm to estimate the current location of the wireless network device based, at least in part, on the initial location of the wireless network device, the difference in the distance between the wireless network device and each pair of the plurality of reference wireless network devices, and the known location of each of the plurality of reference wireless network devices.

3. The method of claim 1, wherein, for each pair of the plurality of reference wireless network devices, said determining the difference in the distance between the wireless network device and the pair of the plurality of reference wireless network devices comprises:

for each pair of the plurality of reference wireless network devices, determining a time difference between the round trip transit time between the wireless network device and a first reference wireless network device of the pair of the plurality of reference wireless network devices and the round trip transit time between the wireless network device and a second reference wireless network device of the pair of the plurality of reference wireless network devices; and determining the difference in the distance between the wireless network device and the pair of the plurality of reference wireless network devices based, at least in part, on the determined time difference.

4. The method of claim 1, wherein, for each pair of the plurality of reference wireless network devices, said determining the difference in the distance between the wireless network device and the pair of the plurality of reference wireless network devices comprises:

for each pair of the plurality of reference wireless network devices, determining a first distance between the wireless network device and a first reference wireless network device of the pair of the plurality of reference wireless network devices based, at least in part, on the round trip transit time between the wireless network device and the first reference wireless network device of the pair of the plurality of reference wireless network devices;

determining a second distance between the wireless network device and a second reference wireless network device of the pair of the plurality of reference wireless network devices based, at least in part, on the round trip transit time between the wireless network device and the second reference wireless network device of the pair of the plurality of reference wireless network devices; and subtracting the first distance and the second distance to yield the difference in the distance between the wireless network device and the pair of the plurality of reference wireless network devices.

5. The method of claim 1, wherein said determining the initial location of the wireless network device based, at least in part, on the known location of each of the plurality of reference wireless network devices comprises:

determining the initial location of the wireless network device as an average of the known location of each of the plurality of reference wireless network devices.

6. The method of claim 1, wherein said determining the initial location of the wireless network device based, at least in part, on the known location of each of the plurality of reference wireless network devices comprises:

determining the initial location of the wireless network device as a weighted combination of the known location of at least a subset of the plurality of reference wireless network devices.

7. The method of claim 1, wherein said determining the initial location of the wireless network device based, at least in part, on the known location of each of the plurality of reference wireless network devices comprises:

determining a location error matrix, wherein each element of the location error matrix represents a difference between an estimated location coordinate of the wireless network device and a corresponding initial location coordinate of the initial location of the wireless network device;

determining a distance difference error matrix, wherein each element of the distance difference error matrix represents a difference between a measured distance difference between the wireless network device and a pair of the plurality of reference wireless network devices and an estimated distance difference between the wireless network device and the pair of the plurality of reference wireless network devices, wherein the measured distance difference is determined based, at least in part, on the round trip transit time between the wireless network device and the pair of the plurality of reference wireless network devices, wherein the estimated distance difference is determined based, at least in part, on the known location of the pair of the plurality of reference wireless network devices and the initial location of the wireless network device;

determining a coefficient matrix as a product of the distance difference error matrix and an inverse of a transpose of the location error matrix; and determining the initial location of the wireless network device based, at least in part, on maximizing the determinant of the product of the coefficient matrix and a transpose of the coefficient matrix.

8. The method of claim 1, further comprising:

identifying the plurality of reference wireless network devices based, at least in part, on analyzing one or more performance measurements associated with at least each of the plurality of reference wireless network devices.

9. The method of claim 1, wherein the wireless network device and the plurality of reference wireless network devices comprise wireless local area network (WLAN) communication capabilities.

10. The method of claim 1, wherein said estimating the current location includes executing a Taylor series based time difference of arrival (TDOA) positioning algorithm and wherein the initial location is used as an input to a first iteration of the TDOA positioning algorithm.

11. The method of claim 10, wherein the TDOA positioning algorithm requires fewer iterations to determine the current location when the initial location is used as the input to the first iteration than when the initial location is not used as the input to the first iteration.

12. A wireless network device comprising:
a network interface; and
a location calculation unit coupled with the network interface, the location calculation unit operable to:
determine a round trip transit time between the wireless network device of a communication network and each of a plurality of reference wireless network devices of a communication network;
for each pair of the plurality of reference wireless network devices, determine a difference in a distance between the wireless network device and the pair of the plurality of reference wireless network devices based, at least in part, on the round trip transit time between the wireless network device and each of the plurality of reference wireless network devices;
determine an initial location of the wireless network device based, at least in part, on a known location of each of the plurality of reference wireless network devices; and
estimate a current location of the wireless network device based, at least in part, on the initial location of the wireless network device, the difference in the distance between the wireless network device and each pair of the plurality of reference wireless network devices, and the known location of each of the plurality of reference wireless network devices.

13. The wireless network device of claim 12, wherein the location calculation unit operable to estimate the current location of the wireless network device comprises the location calculation unit operable to:
execute a single iteration of a Taylor series based time difference of arrival (TDOA) positioning algorithm to estimate the current location of the wireless network device based, at least in part, on the initial location of the wireless network device, the difference in the distance between the wireless network device and each pair of the plurality of reference wireless network devices, and the known location of each of the plurality of reference wireless network devices.

14. The wireless network device of claim 12, wherein, for each pair of the plurality of reference wireless network devices, the location calculation unit operable to determine the difference in the distance between the wireless network device and the pair of the plurality of reference wireless network devices comprises the location calculation unit operable to:
for each pair of the plurality of reference wireless network devices,
determine a time difference between the round trip transit time between the wireless network device and a first reference wireless network device of the pair of the plurality of reference wireless network devices and the round trip transit time between the wireless network device and a second reference wireless network device of the pair of the plurality of reference wireless network devices; and
determine the difference in the distance between the wireless network device and the pair of the plurality of reference wireless network devices based, at least in part, on the determined time difference.

15. The wireless network device of claim 12, wherein, for each pair of the plurality of reference wireless network devices, the location calculation unit operable to determine the difference in the distance between the wireless network device and the pair of the plurality of reference wireless network devices comprises the location calculation unit operable to:
for each pair of the plurality of reference wireless network devices,
determine a first distance between the wireless network device and a first reference wireless network device of the pair of the plurality of reference wireless network devices based, at least in part, on the round trip transit time between the wireless network device and the first reference wireless network device of the pair of the plurality of reference wireless network devices;
determine a second distance between the wireless network device and a second reference wireless network device of the pair of the plurality of reference wireless network devices based, at least in part, on the round trip transit time between the wireless network device and the second reference wireless network device of the pair of the plurality of reference wireless network devices; and
subtract the first distance and the second distance to yield the difference in the distance between the wireless network device and the pair of the plurality of reference wireless network devices.

16. The wireless network device of claim 12, wherein the location calculation unit operable to determine the initial location of the wireless network device based, at least in part, on the known location of each of the plurality of reference wireless network devices comprises the location calculation unit operable to:
determine the initial location of the wireless network device as an average of the known location of each of the plurality of reference wireless network devices.

17. The wireless network device of claim 12, wherein the location calculation unit operable to determine the initial location of the wireless network device based, at least in part, on the known location of each of the plurality of reference wireless network devices comprises the location calculation unit operable to:
determine the initial location of the wireless network device as a weighted combination of the known location of at least a subset of the plurality of reference wireless network devices.

18. The wireless network device of claim 12, wherein the location calculation unit operable to determine the initial location of the wireless network device based, at least in part, on the known location of each of the plurality of reference wireless network devices comprises the location calculation unit operable to:
determine a location error matrix, wherein each element of the location error matrix represents a difference between an estimated location coordinate of the wireless network device and a corresponding initial location coordinate of the initial location of the wireless network device;
determine a distance difference error matrix, wherein each element of the distance difference error matrix represents a difference between a measured distance difference between the wireless network device and a pair of the plurality of reference wireless network devices and an estimated distance difference between the wireless network device and the pair of the plurality of reference wireless network devices, wherein the measured distance difference is determined based, at least in part, on the round trip transit time between the wireless network device and the pair of the plurality of reference wireless network devices, wherein the estimated distance difference is determined based, at least in part, on the known location of the pair of the plurality of reference wireless network devices and the initial location of the wireless network device;

determine a coefficient matrix as a product of the distance difference error matrix and an inverse of a transpose of the location error matrix; and determine the initial location of the wireless network device based, at least in part, on maximizing the determinant of the product of the coefficient matrix and a transpose of the coefficient matrix.

19. One or more non-transitory machine-readable storage media having instructions stored therein, which when executed by one or more processors causes the one or more processors to perform operations that comprise:

determining, at a wireless network device of a communication network, a round trip transit time between the wireless network device and each of a plurality of reference wireless network devices of the communication network;

for each pair of the plurality of reference wireless network devices, determining a difference in a distance between the wireless network device and the pair of the plurality of reference wireless network devices based, at least in part, on the round trip transit time between the wireless network device and each of the plurality of reference wireless network devices;

determining an initial location of the wireless network device based, at least in part, on a known location of each of the plurality of reference wireless network devices; and estimating a current location of the wireless network device based, at least in part, on the initial location of the wireless network device, the difference in the distance between the wireless network device and each pair of the plurality of reference wireless network devices, and the known location of each of the plurality of reference wireless network devices.

20. The machine-readable storage media of claim 19, wherein said operation of estimating the current location of the wireless network device comprises:

executing a single iteration of a Taylor series based time difference of arrival (TDOA) positioning algorithm to estimate the current location of the wireless network device based, at least in part, on the initial location of the wireless network device, the difference in the distance between the wireless network device and each pair of the plurality of reference wireless network devices, and the known location of each of the plurality of reference wireless network devices.

21. The machine-readable storage media of claim 19, wherein, for each pair of the plurality of reference wireless network devices, said operation of determining the difference in the distance between the wireless network device and the pair of the plurality of reference wireless network devices comprises:

for each pair of the plurality of reference wireless network devices,
determining a time difference between the round trip transit time between the wireless network device and a first reference wireless network device of the pair of the plurality of reference wireless network devices and the round trip transit time between the wireless network device and a second reference wireless network device of the pair of the plurality of reference wireless network devices; and determining the difference in the distance between the wireless network device and the pair of the plurality of reference wireless network devices based, at least in part, on the determined time difference.

22. The machine-readable storage media of claim 19, wherein said operation of determining the initial location of the wireless network device based, at least in part, on the known location of each of the plurality of reference wireless network devices comprises:

determining the initial location of the wireless network device as an average of the known location of each of the plurality of reference wireless network devices.

23. The machine-readable storage media of claim 19, wherein said operation of determining the initial location of the wireless network device based, at least in part, on the known location of each of the plurality of reference wireless network devices comprises:

determining a location error matrix, wherein each element of the location error matrix represents a difference between an estimated location coordinate of the wireless network device and a corresponding initial location coordinate of the initial location of the wireless network device;

determining a distance difference error matrix, wherein each element of the distance difference error matrix represents a difference between a measured distance difference between the wireless network device and a pair of the plurality of reference wireless network devices and an estimated distance difference between the wireless network device and the pair of the plurality of reference wireless network devices, wherein the measured distance difference is determined based, at least in part, on the round trip transit time between the wireless network device and the pair of the plurality of reference wireless network devices, wherein the estimated distance difference is determined based, at least in part, on the known location of the pair of the plurality of reference wireless network devices and the initial location of the wireless network device;

determining a coefficient matrix as a product of the distance difference error matrix and an inverse of a transpose of the location error matrix; and determining the initial location of the wireless network device based, at least in part, on maximizing the determinant of the product of the coefficient matrix and a transpose of the coefficient matrix.

24. The machine-readable storage media of claim 19, wherein the operations further comprise:

identifying the plurality of reference wireless network devices based, at least in part, on analyzing one or more performance measurements associated with at least each of the plurality of reference wireless network devices.

* * * * *